US012607842B2

(12) United States Patent
Kondo

(10) Patent No.: US 12,607,842 B2
(45) Date of Patent: Apr. 21, 2026

(54) MAGNIFICATION OBSERVATION DEVICE, MAGNIFICATION OBSERVATION METHOD, AND RECORDING MEDIUM

(71) Applicant: Keyence Corporation, Osaka (JP)

(72) Inventor: Ryosuke Kondo, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 216 days.

(21) Appl. No.: 18/368,066

(22) Filed: Sep. 14, 2023

(65) Prior Publication Data

US 2024/0142763 A1 May 2, 2024

(30) Foreign Application Priority Data

Oct. 28, 2022 (JP) ................................. 2022-172880

(51) Int. Cl.
*G02B 21/36* (2006.01)
*G02B 21/26* (2006.01)
*H04N 23/58* (2023.01)
*H04N 23/67* (2023.01)

(52) U.S. Cl.
CPC ........... *G02B 21/362* (2013.01); *G02B 21/26* (2013.01); *H04N 23/58* (2023.01); *H04N 23/67* (2023.01)

(58) Field of Classification Search
None
See application file for complete search history.

(56) References Cited

U.S. PATENT DOCUMENTS

| | | | |
|---|---|---|---|
| 7,283,299 B2 | 10/2007 | Inomata | |
| 7,308,128 B2 | 12/2007 | Inomata | |
| 8,081,208 B2 | 12/2011 | Inomata et al. | |
| 8,130,264 B2 | 3/2012 | Inomata et al. | |
| 9,007,452 B2 | 4/2015 | Kang | |
| 9,383,569 B2 | 7/2016 | Kang | |
| 9,690,088 B2 * | 6/2017 | Karube | G02B 21/082 |
| 9,690,089 B2 * | 6/2017 | Karube | G02B 21/367 |
| 10,302,931 B2 | 5/2019 | Inomata et al. | |
| 10,379,331 B2 | 8/2019 | Inomata et al. | |
| 10,422,986 B2 | 9/2019 | Inomata et al. | |
| 10,859,806 B2 | 12/2020 | Sekiya et al. | |
| 10,890,747 B2 | 1/2021 | Kang et al. | |

(Continued)

FOREIGN PATENT DOCUMENTS

JP 2002267943 A 9/2002

*Primary Examiner* — Daniel T Tekle

(74) *Attorney, Agent, or Firm* — Kilyk & Bowersox, P.L.L.C.

(57) ABSTRACT

To enable an observation image according to an observation setting to be simply and quickly acquired while focusing on each of a plurality of observation positions. In batch replay, a plurality of observation positions are identified, and replay is executed for each of the plurality of observation positions. In particular, the plurality of observation positions to be observed in the batch replay are identified along with reception of a simple user operation such as designation of a target position (steps S207 and S209) or designation of an observation image (steps S203 and S208). Further, an observation setting when the observation image is acquired at each of the plurality of observation positions is designated along with reception of a simple user operation of designating a desired observation image from among observation images stored in a storage unit (step S203).

10 Claims, 19 Drawing Sheets

(56) References Cited

U.S. PATENT DOCUMENTS

| | | | |
|---|---|---|---|
| 10,890,749 B2 * | 1/2021 | Futami ................. | G02B 21/368 |
| 2015/0185465 A1 * | 7/2015 | Karube ................ | G02B 21/025 |
| | | | 348/79 |
| 2018/0364469 A1 * | 12/2018 | Sakamoto ............ | G02B 21/244 |
| 2018/0373014 A1 * | 12/2018 | Sakamoto ............ | G02B 21/368 |
| 2018/0373015 A1 * | 12/2018 | Sakamoto ............ | G02B 21/367 |
| 2020/0073106 A1 * | 3/2020 | Sekiya ................. | G02B 21/368 |
| 2022/0269061 A1 | 8/2022 | Sekiya et al. | |
| 2022/0269062 A1 * | 8/2022 | Matsumura .......... | G02B 21/025 |
| 2024/0142763 A1 * | 5/2024 | Kondo ................. | G02B 21/362 |

* cited by examiner

FIG. 5

| IMAGE DATA | OBSERVATION COORDINATES | | SETTING DATA Dc | | | |
|---|---|---|---|---|---|---|
| | OBSERVATION POSITION (x,y) | OBSERVATION HEIGHT (z) | ILLUMINATION SETTING | CAPTURING SETTING | ANALYSIS SETTING | |
| Img(1) | (x1,y1) | (z1) | ⋮ | ⋮ | ⋮ | ←Di(1) |
| Img(2) | (x2,y2) | (z2) | ⋮ | ⋮ | ⋮ | ←Di(2) |

OBSERVATION SETTING Co

MAGNIFICATION OBSERVATION DEVICE, MAGNIFICATION OBSERVATION METHOD, AND RECORDING MEDIUM

CROSS-REFERENCE TO RELATED APPLICATIONS

The present application claims foreign priority based on Japanese Patent Application No. 2022-172880, filed Oct. 28, 2022, the contents of which are incorporated herein by reference.

BACKGROUND OF THE INVENTION

1. Field of the Invention

The invention relates to a magnification observation technique for magnifying and observing an observation object.

2. Description of Related Art

A magnification observation device such as a digital microscope causes an imaging element to capture an image generated by forming an image of an observation object placed on a placement table with a lens. In this manner, an observation image is acquired by capturing the observation object. Further, when capturing the observation object, various conditions such as a magnification of a lens, a type of a lens, or an illumination to irradiate the observation object are set. In this regard, JP 2002-267943 A proposes a technique for simplifying settings of various conditions.

Specifically, various conditions when an observed image by a microscope is captured to acquire a captured image are recorded as state information, and the state information is read when the captured image is reproduced to reproduce the conditions indicated in the state information.

Meanwhile, it is possible to use the magnification observation device to acquire observation images at a plurality of observation positions while changing the observation positions with respect to an observation object. However, in such usage, user operations, required to acquire the observation image at each of the plurality of observation positions with a desired observation setting, are complicated. Furthermore, it is necessary to focus on the observation object at the observation position in order to acquire an appropriate observation image. At this time, it takes time to focus the lens at each of the plurality of observation positions, so that it takes time to acquire the observation images at the plurality of observation positions. Therefore, it has been required to enable an observation image according to an observation setting to be simply and quickly acquired while focusing on each of a plurality of observation positions.

SUMMARY OF THE INVENTION

The invention has been made in view of the above problems, and an object thereof is to enable an observation image according to an observation setting to be simply and quickly acquired while focusing on each of a plurality of observation positions.

According to one embodiment of the invention, a magnification observation device includes: a placement table; a lens that forms an image of an observation object placed on the placement table; an imaging element that captures the image of the observation object formed by the lens; a first movement unit that changes a relative position between the placement table and the lens in order to change an observation position; a second movement unit that changes a relative distance of the lens with respect to the placement table in order to change an observation height; a measurement instrument that measures, as a focus height, an observation height of the lens with respect to the placement table in an in-focus state in which the observation object captured by the imaging element is focused; an image acquisition unit that acquires an observation image of the observation object captured by the imaging element based on an observation setting; a storage unit that stores the observation image acquired by the image acquisition unit, the observation setting corresponding to the observation image, and the observation position corresponding to the observation image in association with each other; an identifying unit that receives designation of a target position or designation of a target image from a plurality of the observation images stored in the storage unit and identifies a plurality of observation positions based on the target position or an observation position stored in association with the target image; and a reproduction control unit that controls the first movement unit to relatively move a field of view of the imaging element to each of the plurality of observation positions identified by the identifying unit, controls the second movement unit to adjust the relative distance at each of the plurality of observation positions based on the focus height measured by the measurement instrument and shape information of the observation object, and controls the image acquisition unit to acquire an observation image of the observation object, captured by the imaging element based on an observation setting stored in association with an observation image designated among the observation images stored in the storage unit at each of the plurality of observation positions.

According to one embodiment of the invention, a magnification observation method includes: a step of identifying a plurality of observation positions based on a designated target position or a target image designated from among observation images, the observation images being stored in association with observation settings corresponding to the observation images and observation positions corresponding to the observation images, respectively; and a step of relatively moving a lens that forms an image of an observation object placed on a placement table to each of the plurality of identified observation positions, adjusting a relative distance of the lens with respect to the placement table at each of the plurality of observation positions based on a result, obtained by measuring an observation height of the lens with respect to the placement table as a focus height in an in-focus state in which the observation object captured by an imaging element that captures the image of the observation object formed by the lens is focused, and shape information of the observation object, and acquiring, at each of the plurality of observation positions, an observation image of the observation object captured by the imaging element based on an observation setting stored in association with an observation image designated among the observation images stored in the storage unit.

According to one embodiment of the invention, a magnification observation program causes a computer to execute: a step of identifying a plurality of observation positions based on a designated target position or a target image designated from among observation images, the observation images being stored in association with observation settings corresponding to the observation images and observation positions corresponding to the observation images, respectively; and a step of relatively moving a lens that forms an image of an observation object placed on a placement table to each of the plurality of identified observation positions, adjusting a relative distance of the lens with respect to the placement table at each of the plurality of observation positions based on a result, obtained by measuring an observation height of the lens with respect to the placement table as a focus height in an in-focus state in which the observation object captured by an imaging element that captures the image of the observation object formed by the lens is focused, and shape information of the observation object, and acquiring, at each of the plurality of observation positions, an observation image of the observation object captured by the imaging element based on an observation setting stored in association with an observation image designated among the observation images stored in the storage unit.

According to one embodiment of the invention, a recording medium stores the magnification observation program in a computer-readable manner.

In the invention (the magnification observation device, the magnification observation method, the magnification observation program, and the recording medium) configured as described above, an observation image, an observation setting corresponding to the observation image, and an observation position corresponding to the observation image are stored in the storage unit in advance in association with each other. Then, designation of a target position or designation of a target image from the observation images stored in the storage unit is received to identify a plurality of observation positions based on the target position or an observation position stored in association with the target image. That is, the plurality of observation positions to be observed are identified along with reception of a simple user operation such as the designation of the target position or the observation image. Subsequently, the observation image of the observation object captured by the imaging element is acquired at each of the plurality of observation positions based on the observation setting stored in association with the observation image designated among the observation images stored in the storage unit while relatively moving the lens to each of the plurality of identified observation positions. That is, the observation setting when the observation image is acquired at each of the plurality of observation positions is designated along with reception of a simple user operation of designating a desired observation image from among the observation images stored in the storage unit. Moreover, the relative distance of the lens with respect to the placement table is adjusted at each of the plurality of observation positions based on the result, obtained by measuring the observation height of the lens with respect to the placement table in the in-focus state in which the observation object is focused as the focus height, and the shape information of the observation object. As a result, it is possible to simply and quickly acquire the observation image according to the observation setting while focusing on each of the plurality of observation positions.

According to the invention, it is possible to simply and quickly acquire the observation image according to the observation setting while focusing on each of the plurality of observation positions as described above.

BRIEF DESCRIPTION OF THE DRAWINGS

FIG. 5 is a view schematically illustrating an example of a data storage mode executed by the normal observation of FIG. 4;

DETAILED DESCRIPTION OF PREFERRED EMBODIMENTS

Figure 1:
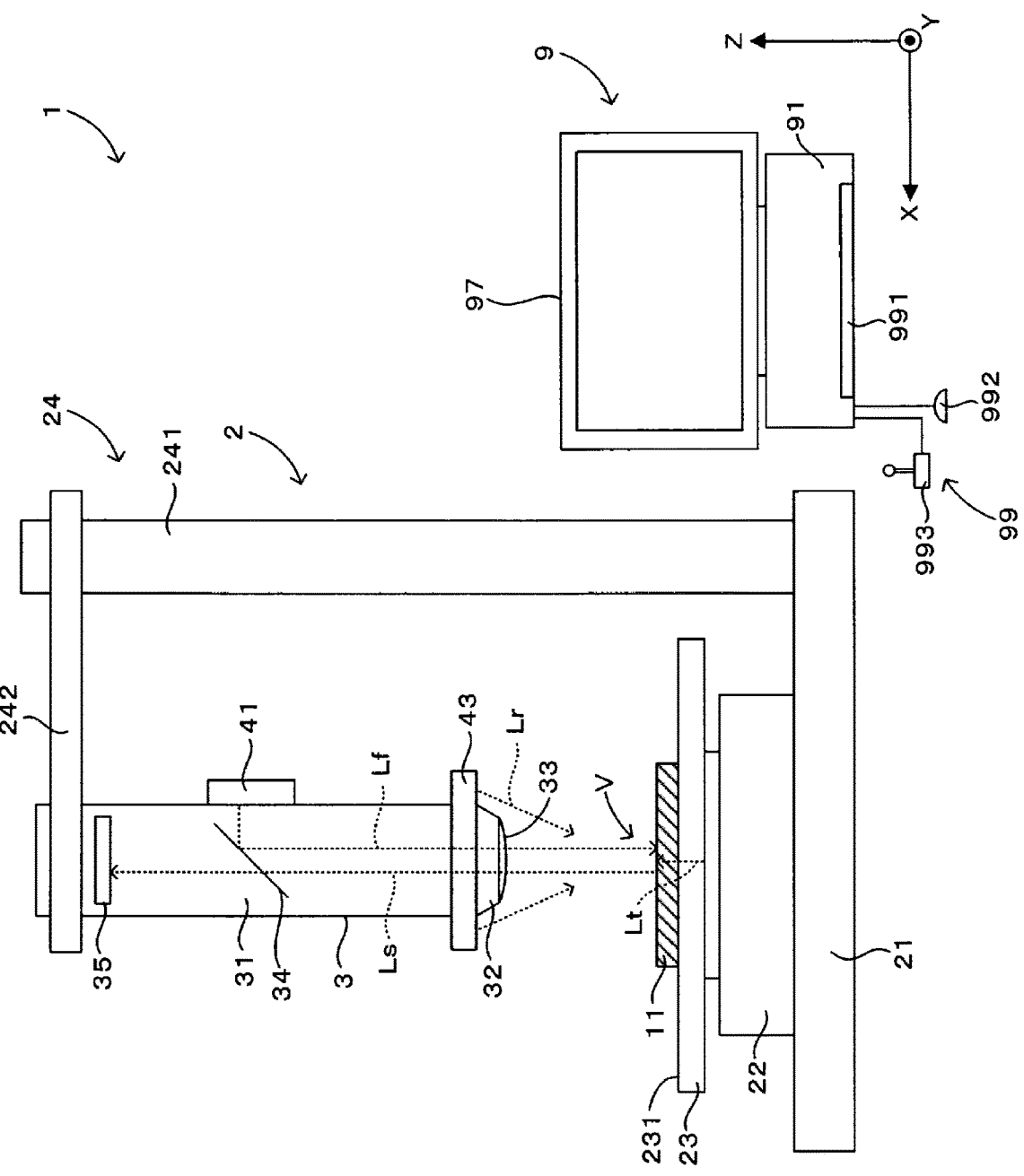
FIG. 1 is a diagram schematically illustrating a configuration of a magnification observation device according to the invention.
Figure 2:
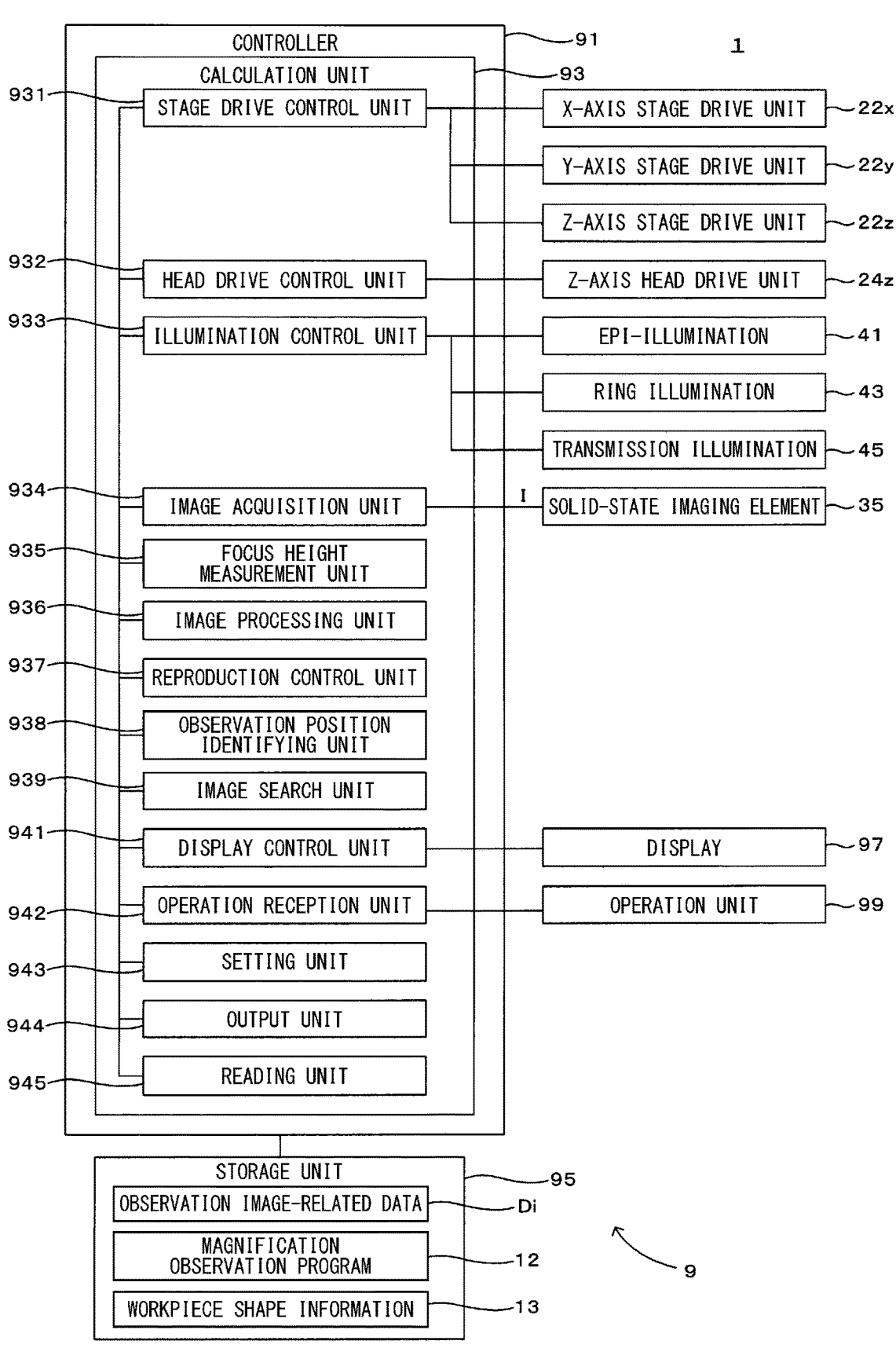
FIG. 2 is a block diagram illustrating an electrical configuration of the magnification observation device of FIG. 1.

FIG. 1 is a diagram schematically illustrating a configuration of a magnification observation device according to the invention, and FIG. 2 is a block diagram illustrating an electrical configuration of the magnification observation device of FIG. 1. Note that FIG. 1 and the following drawings appropriately illustrate an X direction which is the horizontal direction, a Y direction which is the horizontal direction orthogonal to the X direction, and a Z direction which is the vertical direction. A magnification observation device 1 illustrated in FIG. 1 displays an observation image obtained by magnifying a workpiece 11, which is an observation object, to a user. The magnification observation device 1 includes a microscope 2 that acquires an observation image obtained by magnifying a workpiece 11, and a control system 9 that controls the microscope 2.

As illustrated in FIG. 2, the control system 9 includes a controller 91, and the controller 91 includes a calculation unit 93 and a storage unit 95. The calculation unit 93 is a processor such as a central processing unit (CPU), and the storage unit 95 is a storage device such as a hard disk drive (HDD) or a solid state drive (SSD). The storage unit 95 stores observation image-related data Di including an observation image I acquired by the microscope 2 and metadata (setting data) associated with the observation image I. Furthermore, the storage unit 95 stores a magnification observation program 12, and the calculation unit 93 executes the magnification observation program 12 read from the storage unit 95 to construct a stage drive control unit 931, a head drive control unit 932, an illumination control unit 933, an image acquisition unit 934, a focus height measurement unit 935, an image processing unit 936, a reproduction control unit 937, an observation position identifying unit 938, an image search unit 939, a display control unit 941, an operation reception unit 942, a setting unit 943, an output unit 944, and a reading unit 945. Details of these functional units 931 to 938 and 941 to 945 will be described later. Note that the magnification observation program 12 is downloaded from, for example, an external server computer (recording medium) and stored in the storage unit 95. Furthermore, workpiece shape information 13 indicating a shape of the workpiece 11 is stored in the storage unit 95. In the present embodiment, the workpiece shape information 13 includes information indicating that the shape of the workpiece 11 is a plane. The workpiece shape information 13 is not limited to information indicating that the shape of the workpiece 11 is the plane, and may include information indicating a three-dimensional shape or information indicating a geometric shape such as a cylinder.

Furthermore, the control system 9 further includes a display 97 that displays the observation image of the workpiece 11 to the user, and an operation unit 99 on which an operation of the user on the magnification observation device 1 is executed. The display 97 performs display according to control of the display control unit 941. The operation unit 99 includes an input device such as a keyboard 991, a mouse 992, or a joystick 993, and the user can input a command to the magnification observation device 1 by operating the input device. In this regard, the operation reception unit 942 receives the command indicated by the operation from the operation unit 99 according to the user operation on the operation unit 99.

As illustrated in FIG. 1, the microscope 2 includes a base 21 placed on an installation surface of the microscope 2, a stage drive mechanism 22 disposed on the base 21, and a stage 23 supported by the stage drive mechanism 22. The stage 23 has a sample support plane 231 that is horizontal and the workpiece 11 is placed on the sample support plane 231. The stage drive mechanism 22 includes an X-axis stage drive unit 22$x$, a Y-axis stage drive unit 22$y$, and a Z-axis stage drive unit 22$z$ illustrated in FIG. 2. The X-axis stage drive unit 22$x$ includes a motor that drives the stage 23 in the X direction in accordance with a command from the stage drive control unit 931, the Y-axis stage drive unit 22$y$ includes a motor that drives the stage 23 in the Y direction in accordance with a command from the stage drive control unit 931, and the Z-axis stage drive unit 22$z$ includes a motor that drives the stage 23 in the Z direction in accordance with a command from the stage drive control unit 931. As these motors, for example, a stepping motor can be used.

Then, the stage drive control unit 931 controls the X-axis stage drive unit 22$x$, the Y-axis stage drive unit 22$y$, and the Z-axis stage drive unit 22$z$ to move the stage 23 in the X direction, the Y direction, and the Z direction. For example, when the operation reception unit 942 receives a command corresponding to an operation on the joystick 993, the stage drive control unit 931 controls the X-axis stage drive unit

22$x$ and the Y-axis stage drive unit 22$y$ in accordance with the command to move the stage 23 in the X direction and the Y direction.

Further, the microscope 2 includes an observation head 3 facing the sample support plane 231 of the stage 23 from above. The observation head 3 has an observation field of view V, and captures the observation image I of a portion overlapping the observation field of view V in the workpiece 11 on the sample support plane 231. The observation head 3 includes a housing 31 having a tubular shape extending in the Z direction, a lens holder 32 provided at a lower end of the housing 31, and an objective lens 33 attached to the lens holder 32. Furthermore, the observation head 3 has a half mirror 34 and a solid-state imaging element 35 disposed in the housing 31, and the half mirror 34 is located between the housing 31 and the solid-state imaging element 35. The objective lens 33 faces the workpiece 11 on the sample support plane 231 from above, and light Ls emitted from the workpiece 11 and incident on the objective lens 33 passes through the half mirror 34 and then forms an image on the solid-state imaging element 35. Note that the image formation of the light Ls is performed by an imaging optical system including a lens (not illustrated) or a mirror, provided in addition to the objective lens 33, and the objective lens 33. The solid-state imaging element 35 is a CCD image sensor, a CMOS image sensor, or the like, and captures the observation image I of the workpiece 11 by detecting the image of the light Ls formed on the solid-state imaging element 35. The observation image I captured by the solid-state imaging element 35 is transmitted from the solid-state imaging element 35 to the image acquisition unit 934. Thus, the image acquisition unit 934 acquires the observation image I of the workpiece 11 in the observation field of view V.

Note that the lens holder 32 of a revolver type to which a plurality of the objective lenses 33 having different magnifications are attached may be used as the lens holder 32. In this case, one objective lens 33 facing the workpiece 11 can be switched from among the plurality of objective lenses 33 by rotating the lens holder 32. That is, the magnification at the time of acquiring the observation image I can be switched.

The microscope 2 includes an epi-illumination 41 attached to the housing 31 of the observation head 3. The epi-illumination 41 is attached to a side surface of the housing 31 so as to face the half mirror 34 in the housing 31 from the side. Light Lf emitted from the epi-illumination 41 is reflected toward the objective lens 33 by the half mirror 34 and applied to the workpiece 11 via the objective lens 33. The workpiece 11 is irradiated with the light Lf in parallel in the Z direction. The light Lf with which the workpiece 11 has been irradiated is reflected by the workpiece 11 and is incident on the objective lens 33 as the light Ls.

Figure 3:
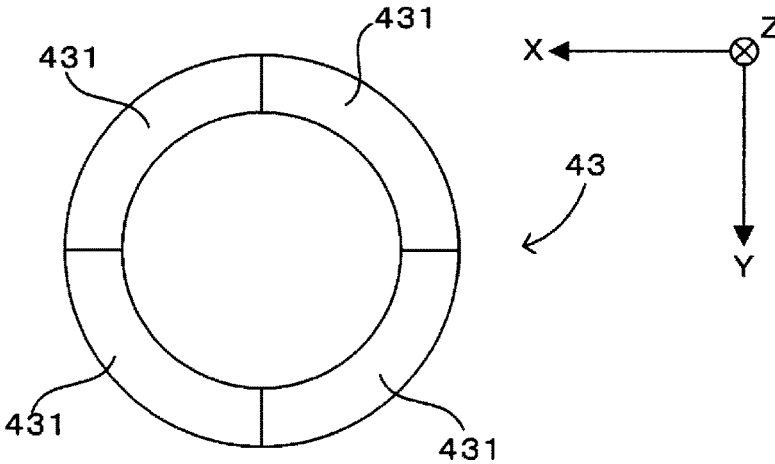
FIG. 3 is a bottom view schematically illustrating a configuration of a ring illumination.

Further, the microscope 2 includes a ring illumination 43 (FIG. 3) attached to the housing 31 of the observation head 3. Here, FIG. 3 is a bottom view schematically illustrating a configuration of the ring illumination. The ring illumination 43 is attached to the outer side of the housing 31 so as to surround the objective lens 33 in the bottom view. The workpiece 11 is irradiated with light Lr emitted from the ring illumination 43 while being inclined with respect to the Z direction. Further, as illustrated in FIG. 3, a plurality of light emitting units 431 arranged circumferentially are provided, and the plurality of light emitting units 431 are turned on and off independently of each other. Therefore, a direction in which the workpiece 11 is irradiated with the light Lr can be switched by changing the light emitting unit 431 to be turned on among the plurality of light emitting units 431. The light Lr with which the workpiece 11 has been irradiated is reflected by the workpiece 11 and is incident on the objective lens 33 as the light Ls.

Furthermore, the microscope 2 includes a transmission illumination 45 that emits light Lt from the lower side of the workpiece 11 toward the objective lens 33. The transmission illumination 45 is disposed inside the sample support plane 231, for example, and is used to observe the workpiece 11 that transmits the light Lt such as a biological tissue. The light Lt emitted from the transmission illumination 45 passes through the workpiece 11 and is incident on the objective lens 33 as the light Ls.

A setting when the workpiece 11 is irradiated with the light Lf, the light Lr, and the light Lt by the epi-illumination 41, the ring illumination 43, and the transmission illumination 45, that is, an illumination setting is controlled by the illumination control unit 933. Here, the illumination setting includes at least one of:

whether the light Lf is emitted by the epi-illumination 41 and the intensity of the light Lf;
   whether the light Lr is emitted by each of the plurality of light emitting units 431 included in the ring illumination 43 and the intensity of the light Lr;
   whether the light Lt is emitted by the transmission illumination 45 and the intensity of the light Lt; and
   an aperture value of the objective lens 33.

The solid-state imaging element 35 is controlled by the image acquisition unit 934 in accordance with a capturing setting. Here, the capturing setting may include white balance and gain exposure time of the solid-state imaging element 35. Such a setting is stored in the storage unit 95, and the stored setting is used at the time of reproduction, whereby the reproducibility of observation can be enhanced.

Furthermore, the microscope 2 includes a head support unit 24 that supports the observation head 3 so as to be movable in the Z direction. The head support unit 24 includes a Z-axis guide 241 erected from the base 21 in parallel with the Z direction and a Z-axis movable member 242 guided in the Z direction by the Z-axis guide 241, and the housing 31 of the observation head 3 is attached to the Z-axis movable member 242. Further, the head support unit 24 includes a Z-axis head drive unit 24z illustrated in FIG. 2. The Z-axis head drive unit 24z includes a motor (for example, a stepping motor) that moves the observation head 3 in the Z direction by driving the Z-axis movable member 242 in the Z direction according to a command of the head drive control unit 932. Further, the epi-illumination 41 and the ring illumination 43 also move in the Z direction along with the movement of the observation head 3 in the Z direction.

Figure 4:
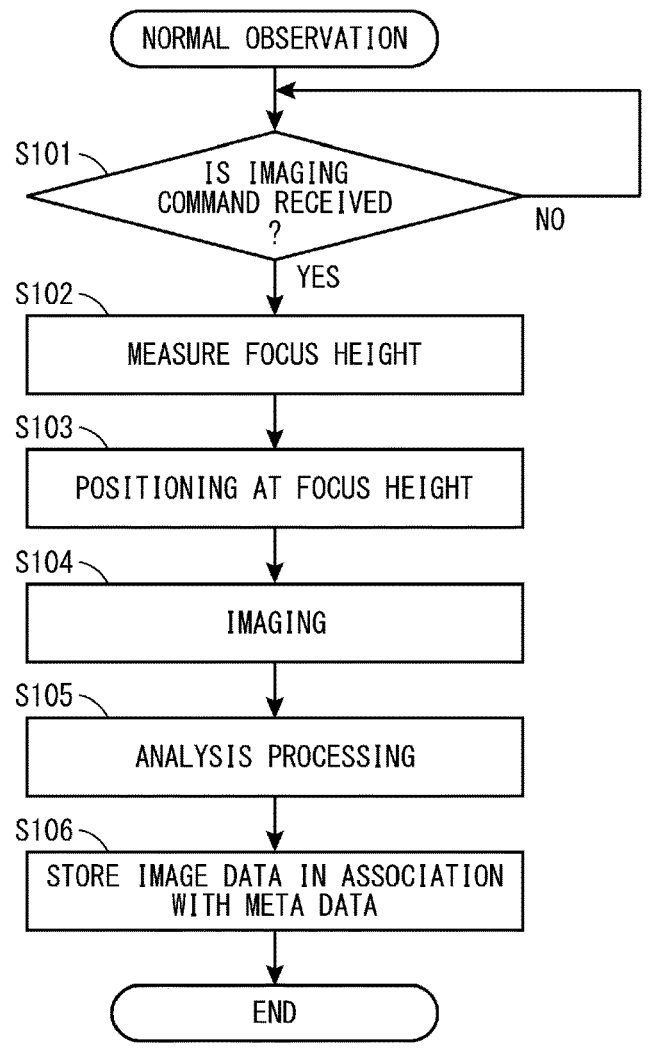
FIG. 4 is a flowchart illustrating an example of normal observation executed by the magnification observation device.

FIG. 4 is a flowchart illustrating an example of normal observation executed by the magnification observation device, and FIG. 5 is a view schematically illustrating an example of a data storage mode executed by the normal observation of FIG. 4. The normal observation in FIG. 4 is performed under the control of the controller 91, the observation image I of the workpiece 11 is captured, image processing (analysis processing) is performed on the observation image I, and the observation image I is stored in the storage unit 95.

In this normal observation, the workpiece 11 on the stage 23 is moved in the X direction or the Y direction in response to the operation reception unit 942 receiving a command indicating movement in the X direction or the Y direction according to the operation of the joystick 993 by the user. Accordingly, the observation field of view V moves relative to the workpiece 11, and the observation field of view V can be positioned in a portion of the workpiece 11 to be observed.

Then, when the operation reception unit 942 receives an imaging command to capture the observation field of view V ("YES" in step S101), the setting unit 943 executes each setting according to the imaging command received from the operation reception unit 942 to the image acquisition unit 934, the focus height measurement unit 935, and the image processing unit 936. That is, the imaging command includes a position of the observation field of view V positioned by the operation of the operation unit 99 such as the joystick 993 by the user, the setting (illumination setting or the like) at the time of capturing an image of the workpiece 11, a content of the analysis processing (step S105) described later, and the like. In this regard, when an imaging command based on the operation of the operation unit 99 is received from the operation reception unit 942, the setting unit 943 executes each setting according to the imaging command to the image acquisition unit 934, the focus height measurement unit 935, and the image processing unit 936. In step S102, the focus height measurement unit 935 measures a focus height according to the setting by the setting unit 943. Specifically, in response to a command from the focus height measurement unit 935, the stage drive control unit 931 moves (raises or lowers) the observation head 3 in the Z direction by the Z-axis head drive unit 24z, and the image acquisition unit 934 captures the observation image I a plurality of times by the solid-state imaging element 35. As a result, the plurality of observation images I indicating the workpiece 11 formed by the objective lens 33 at different heights are acquired. Then, based on the contrast of each of the plurality of observation images I, the focus height measurement unit 935 obtains a height of the objective lens 33 focused on the workpiece 11 at a representative point (for example, a center point) of the observation field of view V as the focus height. The focus height thus measured is output from the focus height measurement unit 935 to the head drive control unit 932.

In step 103, the head drive control unit 932 controls the Z-axis head drive unit 24z based on the focus height received from the focus height measurement unit 935 to position the objective lens 33 at the focus height obtained in step S102. In step S104, the image acquisition unit 934 causes the solid-state imaging element 35 to capture the observation field of view V according to the setting by the setting unit 943, and acquires the observation image I of the workpiece 11 in the observation field of view V.

In step S105, the image processing unit 936 executes the analysis processing (image processing) according to the setting by the setting unit 943 on the observation image I acquired in step S104. Specifically, the workpiece 11 includes a metallographic structure, and the image acquisition unit 934 classifies a grain size indicated by the observation image I of the metallographic structure included in the workpiece 11 into any of grain size numbers 1 to 8 in a standard grain size chart (metallographic analysis). In this classification, analysis processing of performing the classification by a learned machine learning model may be performed. Further, as the metallographic analysis, analysis processing of extracting nonmetallic inclusions such as an oxide compound and a sulfide compound contained in the workpiece 11 and performing measurement and classification may be performed in addition to the classification of a crystal grain size. Furthermore, analysis processing for calculating a spheroidization rate of graphite contained in metal may be performed as the metallographic analysis. In step S106, the observation image I acquired by the image processing unit 936 and setting data Dc (metadata) when the observation image I is captured are associated with each other by the output unit 944, and are stored as the observation image-related data Di in the storage unit 95 from the output unit 944.

As a result, as illustrated in FIG. 5, the observation image-related data Di(1), Di(2), and so on indicating image data Img(1), Img (2), and so on indicating the observation image I and the setting data Dc associated with the image data Img(1), Img (2), and so on are accumulated in the storage unit 95. As illustrated in FIG. 5, the setting data Dc includes observation coordinates which are coordinates of the objective lens 33 when the observation image I has been captured. The observation coordinates of the objective lens 33 include an observation position (a X coordinate and a Y coordinate) which is a position of the objective lens 33 and an observation height (Z coordinate) which is a height of the objective lens 33. Furthermore, the setting data Dc includes an illumination setting when the observation image I has been captured, a capturing setting when the observation image I is acquired, and an analysis setting when analysis processing (image processing) on the observation image I is executed. Further, in replay control to be described next, an observation setting Co included in the setting data Dc is read from the storage unit 95 and used. In the present embodiment, the observation setting Co includes items other than the observation position (X, Y) and the observation height (Z) in the setting data Dc.

Figure 6:
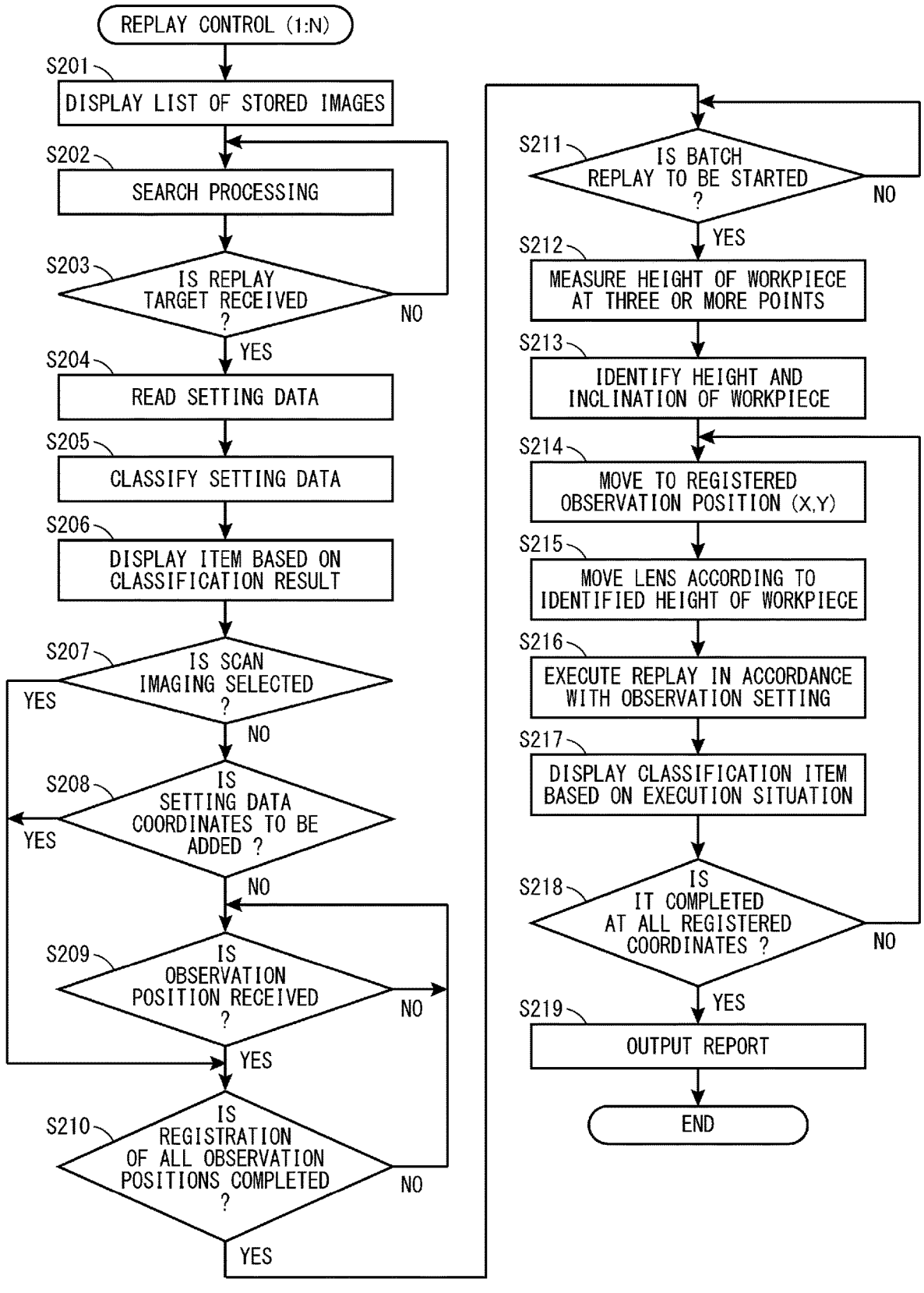
FIG. 6 is a flowchart illustrating a first example of replay control.
Figure 7:
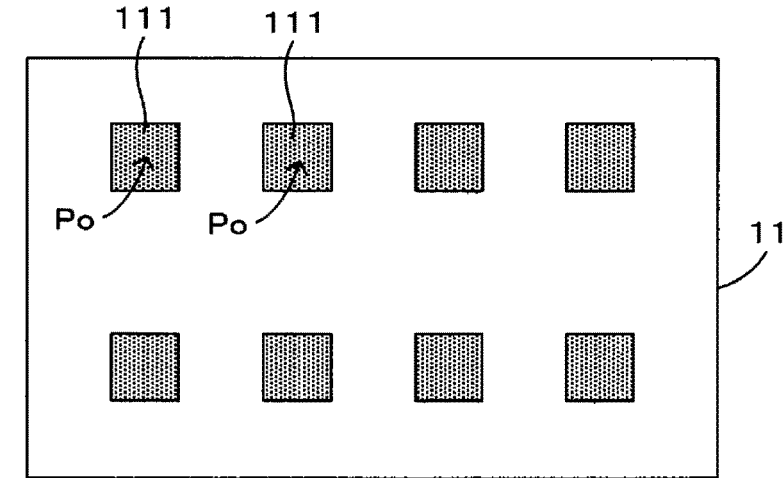
FIG. 7 is a view schematically illustrating an example of a sample to be subjected to the replay control.
Figure 8A:
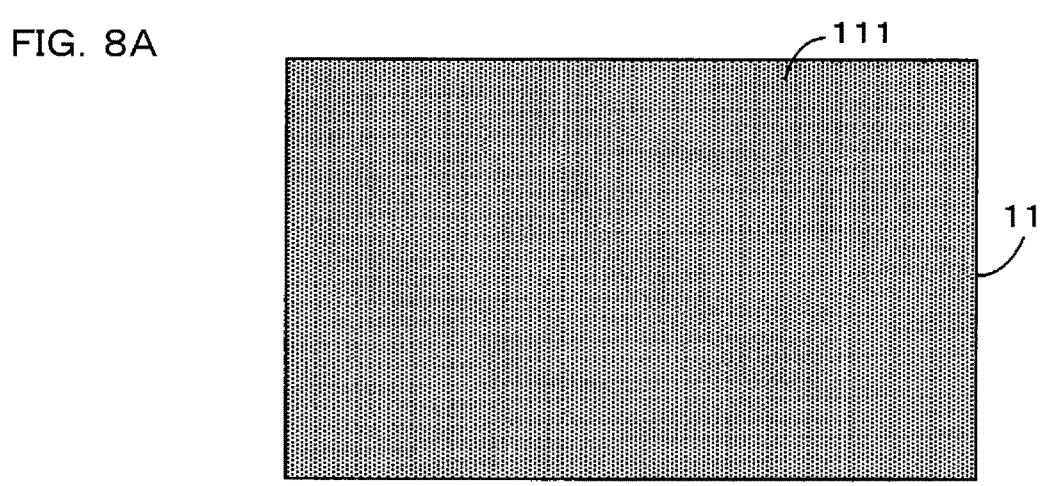
FIG. 8A is a view schematically illustrating another example of the sample to be subjected to the replay control.
Figure 8B:
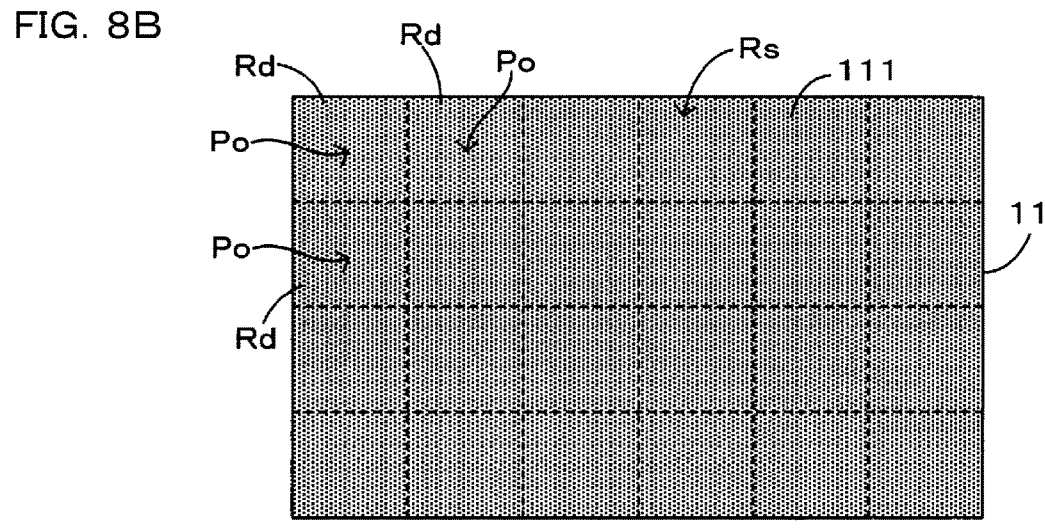
FIG. 8B is a view schematically illustrating another example of the sample to be subjected to the replay control.

That is, in the present embodiment, it is possible to execute the replay control of replaying observation based on the observation setting Co indicated by the observation image-related data Di stored in the storage unit 95. FIG. 6 is a flowchart illustrating a first example of the replay control; FIG. 7 is a view schematically illustrating an example of a sample to be subjected to the replay control; FIGS. 8A and 8B are views schematically illustrating another example of the sample to be subjected to the replay control; and FIGS. 9A to 9G are views schematically illustrating screens displayed on the display for the replay control. The replay control of FIG. 6 is executed based on control of the reproduction control unit 937. Note that "1:N" in FIG. 6 indicates that observation based on the observation setting Co associated with one observation image I selected as a replay target is executed (replayed) for N (N is plural) observation positions (X, Y).

Figure 9A:
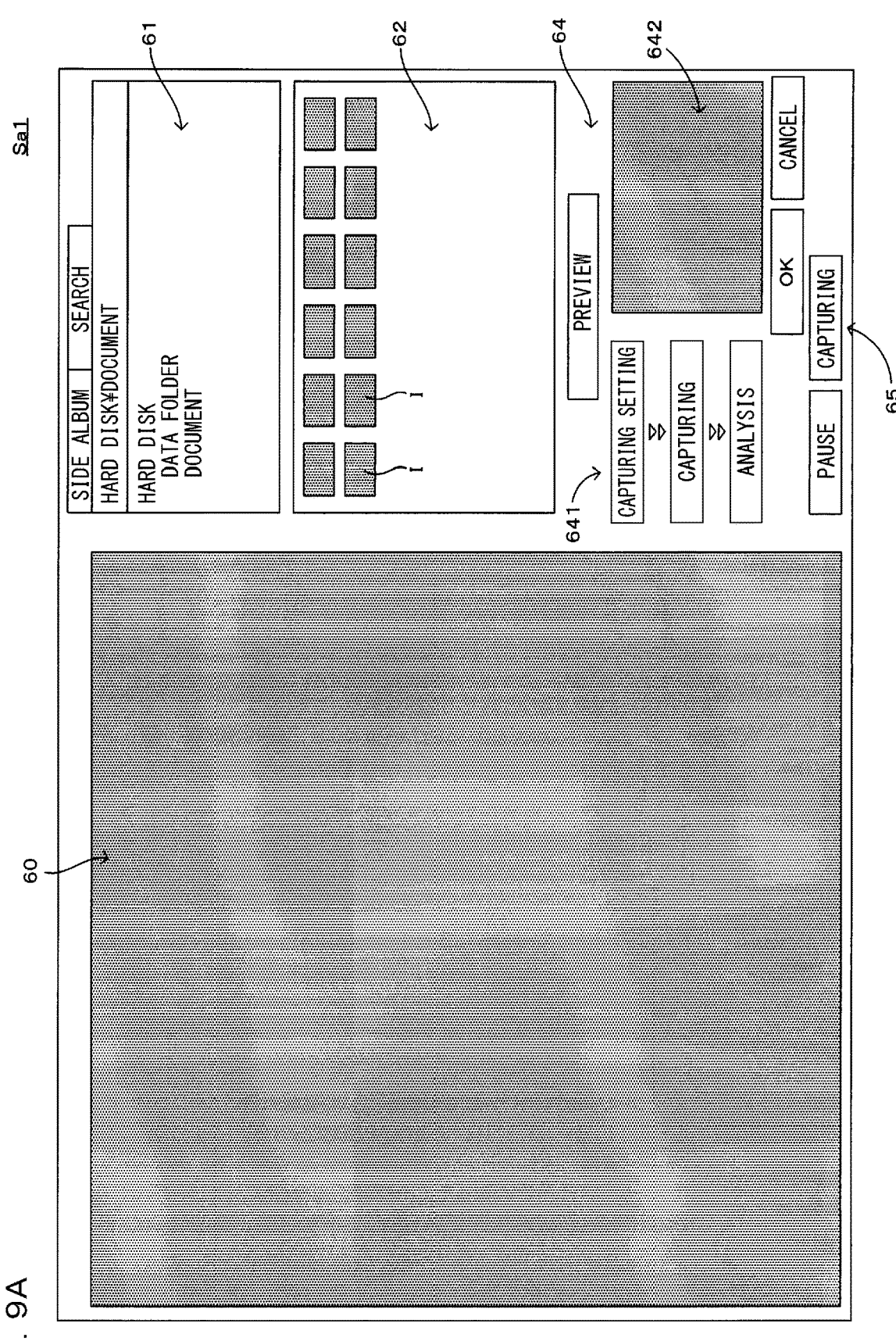
FIG. 9A is a view schematically illustrating a screen displayed on a display for the replay control.

In step S201, the display control unit 941 displays the plurality of observation images I read from the storage unit 95 by the reading unit 945 on the display 97. Specifically, a screen Sa1 illustrated in FIG. 9A is displayed on the display 97 by the display control unit 941. The screen Sa1 includes a navigation section 60 for displaying an image of the observation field of view V in real time. Further, the screen Sa1 includes a directory information display section 61 indicating information regarding a directory of the observation images I stored in the storage unit 95. The directory information display section 61 includes a side album tab and a search tab. When the side album tab is selected, a directory in which the observation images I are stored is displayed on the directory information display section 61. When the search tab is selected, a screen for searching for the observation image I is displayed on the directory information display section 61. Furthermore, the screen Sa1 includes an image list display section 62 that displays a list of the plurality of observation images I stored in the directory selected in the directory information display section 61. Further, the screen Sa1 includes an execution content display section 64 indicating a content to be executed in the replay. The execution content display section 64 includes an item display section 641 indicating the respective items (capturing setting, capturing, and analysis) to be executed in the replay, and a preview display section 642 indicating an image (preview) at an observation position, which is an execution target of each item, of the workpiece 11. Further, the screen Sa1 includes a button operation section 65 provided with a button for receiving an operation by the user.

In step S201, a list of the plurality of observation images I stored in the storage unit 95 is displayed on the image list display section 62 of the screen Sa1. Further, in step S202, in response to the operation of the directory information display section 61 in a state where the search tab is selected, the image search unit 939 searches the storage unit 95 for the observation image I according to search conditions designated in the directory information display section 61 (search processing). The image search unit 939 receives, as the search conditions, the time at which the observation image I has been captured, the illumination setting at the time of capturing the observation image I, a content and a result of the image processing executed on the observation image I, and the like. As the search processing is executed, the observation images I corresponding to the search conditions are displayed in the image list display section 62.

In step S203, the reproduction control unit 937 determines whether the operation reception unit 942 has received a selection operation of selecting one observation image I as a replay target from among the observation images I corresponding to the search conditions displayed on the image list display section 62. When the operation reception unit 942 has not received the selection operation ("NO" in step S203), the flow returns to the search processing in step S202. On the other hand, when the operation reception unit 942 has received the selection operation ("YES" in step S203), the reproduction control unit 937 causes the reading unit 945 to read, from the storage unit 95, the setting data Dc associated with one observation image I selected as the replay target (step S204).

In step 205, the setting data Dc associated with the one observation image I is classified according to various items. Examples of the items include a capturing setting or an analysis setting of the observation image I. Further, examples of the capturing setting of the observation image I include the above-described illumination setting, a magnification for capturing the observation image I, exposure time, white balance, a gain, halation removal, a high dynamic range, removal of ring-shaped reflection light, an optical shadow effect mode, multi-lighting for automatically optimizing the illumination setting, and the like. Examples of an image synthesis setting include depth synthesis, 3D synthesis, image connection, and the like. Examples of the analysis setting include 2D measurement, 3D measurement, metallographic analysis, and the like. Further, a report format corresponding to a type of metallographic analysis may be included as the analysis setting, and may be associated with the observation image I. Then, in step S206, the reproduction control unit 937 displays the items (capturing setting, capturing, and analysis) included in the setting data Dc on the item display section 641 of the screen Sa1 based on a classification result in step S205 (step S206).

In step S207, the reproduction control unit 937 determines whether to execute replay by scan imaging. That is, as an execution mode of the replay, the scan imaging and discrete imaging are provided. In the scan imaging, a scan range Rs wider than the observation field of view V is set for the workpiece 11, and the entire scan range Rs is captured by capturing the observation field of view V while changing a position (that is, an observation position Po) of the observation field of view V within the scan range Rs. In the discrete imaging, the workpiece 11 is partially captured by capturing the observation field of view V while moving the observation field of view V to each of a plurality of the observation positions Po discretely set with respect to the workpiece 11. In this regard, the operation reception unit 942 receives one of a scan imaging execution command and a discrete imaging execution command according to the user operation input to the operation unit 99.

For example, it is assumed that the workpiece 11 is a plurality of metal samples 111 each being formed of a metallographic structure as illustrated in FIG. 7. In this case, the workpiece 11 may be used in which the plurality of metal samples 111 are held on a soft material, such as clay, with a flat plate pressing upper surfaces of the plurality of metal samples 111 in order to make heights of the plurality of metal samples 111 uniform. When the plurality of metal samples 111 are discretely arranged, the discrete imaging execution command is input and received by the operation reception unit 942 ("NO" in step S207). Incidentally, here, the workpiece 11 in FIG. 7 is illustrated as an example of a discrete imaging execution target. However, the discrete imaging can also be used, for example, in a case where a plurality of electrodes (pins) included in an integrated circuit (IC) is captured in order.

Figure 9B:
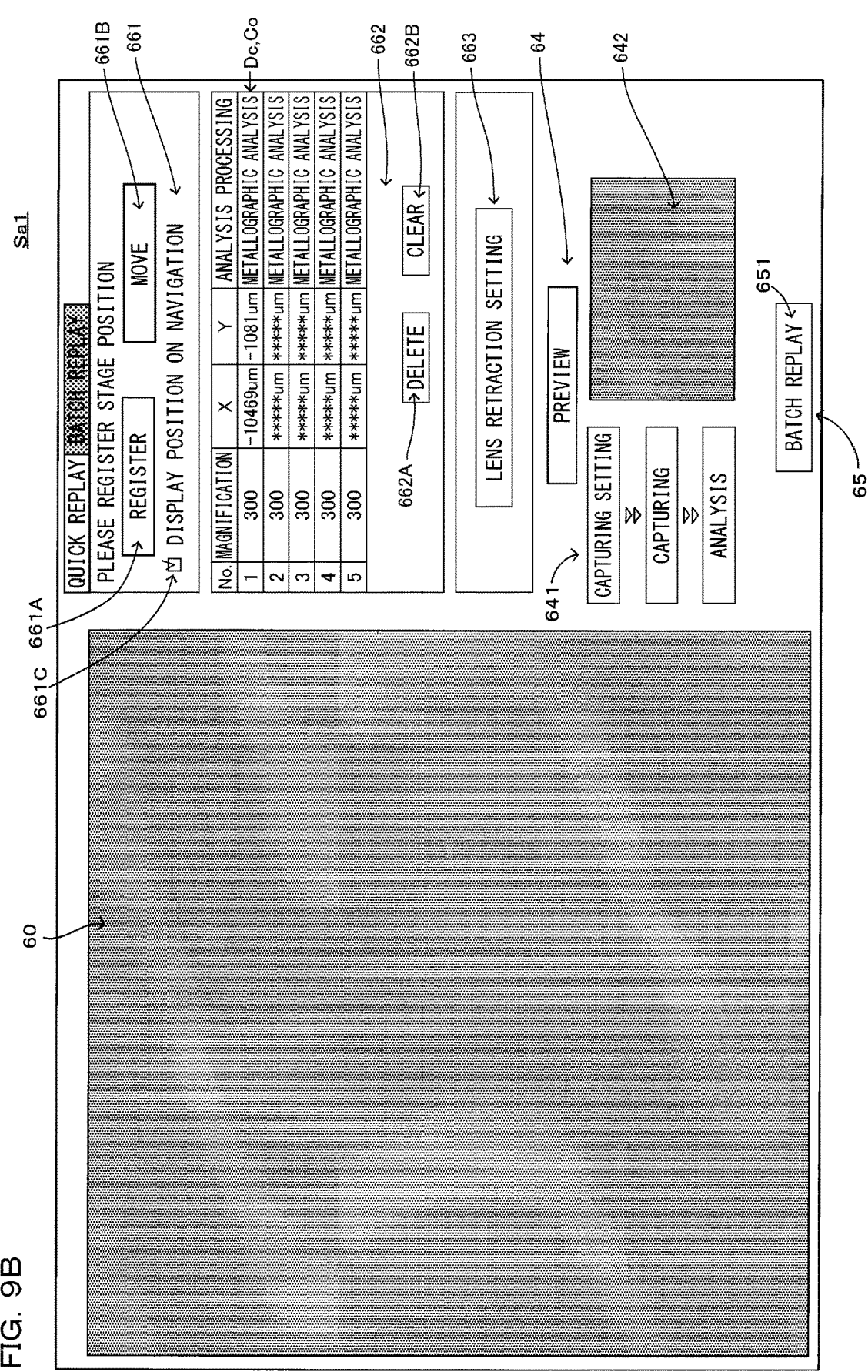
FIG. 9B is a view schematically illustrating a screen displayed on the display for the replay control.

Accordingly, as illustrated in FIG. 9B, an observation position registration section 661 for registering the observation positions Po and an observation position list section 662 for displaying the registered observation positions Po in a list are provided on the screen Sa1. The observation position registration section 661 is provided with a register button 661A and a move button 661B. Further, in the button operation section 65, a batch replay button 651 is provided. When the operation reception unit 942 receives an operation of the register button 661A of the observation position registration section 661, the reproduction control unit 937 registers a current position (X coordinate and Y coordinate) of the stage 23 as the observation position Po and adds the observation position Po to the list of the observation position list section 662. Note that the observation position list section 662 displays the observation setting Co such as a magnification and image processing in addition to the observation position Po(X, Y) and the observation height (Z). The observation setting Co is the observation setting Co included in the setting data Dc associated with the observation image I received as the replay target in step S203.

In step S208, the observation position identifying unit 938 determines whether to register the observation position Po included in the setting data Dc read in step S204 in the observation position Po in the replay. That is, it is determined whether to register the past observation position Po at the time of capturing the observation image I, associated with the setting data Dc, to the observation position Po in the current replay. When the observation position identifying unit 938 determines to register the observation position Po of the setting data Dc based on a command of the user received by the operation reception unit 942 (case of "YES" in step S208), the observation position Po is added to the list of the observation position list section 662, and the flow proceeds to step S210.

On the other hand, when determining not to register the observation position Po of the setting data Dc ("NO" in step S208), the observation position identifying unit 938 determines whether the operation reception unit 942 has received the registration of the observation position Po (step S209). As described above, the observation position registration section 661 is provided with the register button 661A. When the operation reception unit 942 receives the operation of the register button 661A, the observation position identifying unit 938 registers the current position (X coordinate and Y coordinate) of the stage 23 in the observation position Po ("YES" in step S209), and proceeds to step S210. The observation position Po thus registered is added to the list of the observation position list section 662.

Figure 9C:
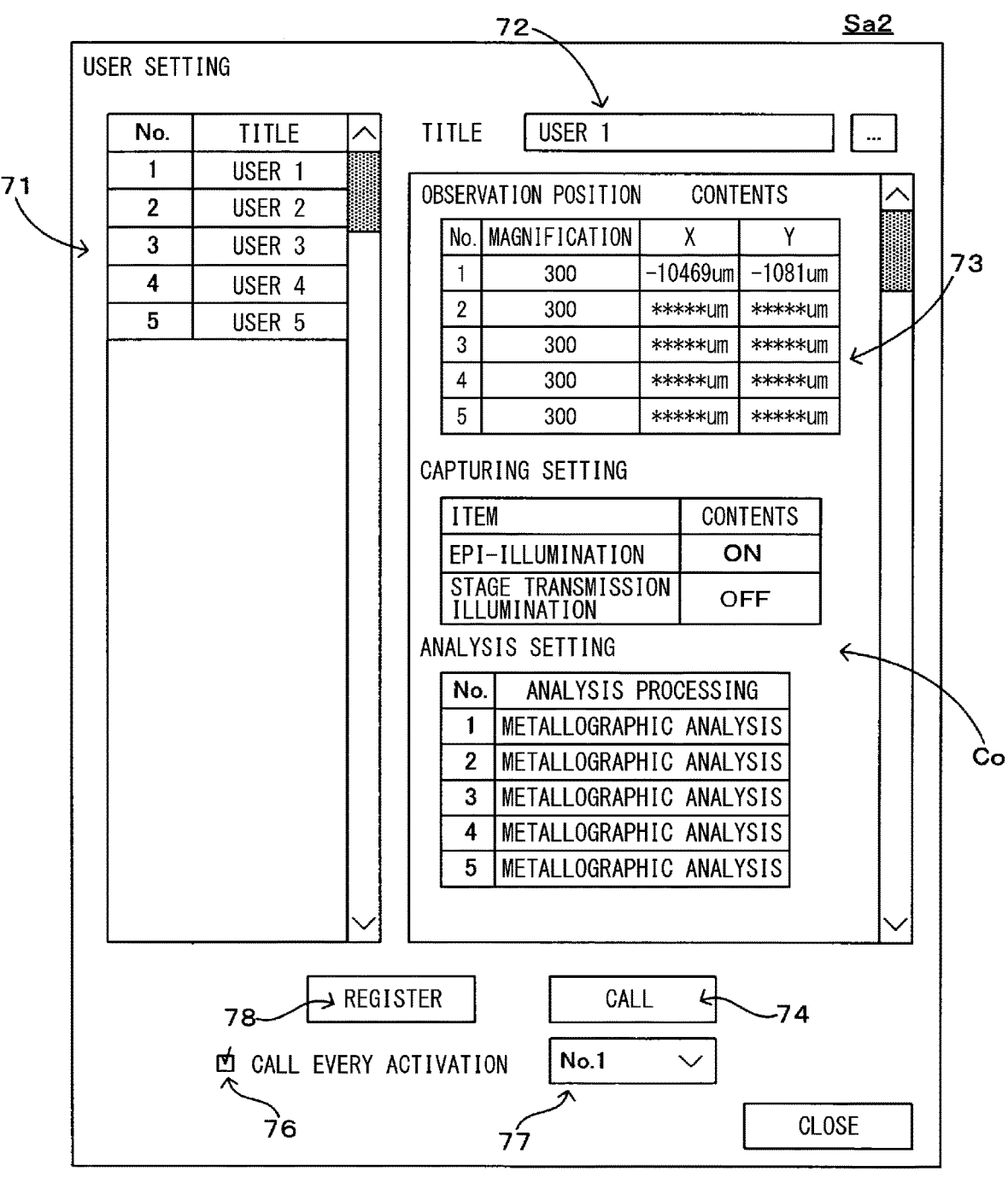
FIG. 9C is a view schematically illustrating a screen displayed on the display for the replay control.

Alternatively, in step S209, a plurality of setting positions (X, Y) set in advance by the user may be registered as the observation positions Po on a screen Sa2 illustrated in FIG. 9C. The screen Sa2 of FIG. 9C includes: a user setting list section 71 that displays a list of a plurality of user settings (User 1, User 2, and so on) each indicating a combination of a plurality of setting positions (X, Y) set by the user; a selection setting display section 72 indicating one user setting selected from the user setting list section 71; and an observation setting display section 73 that indicates a plurality of setting positions (observation positions) indicated in the selected one user setting and the observation setting Co (capturing setting and analysis setting) at the time of performing replay in the past for the setting positions. The screen Sa2 is provided with a call button 74. When the operation reception unit 942 receives an operation of the call button 74, the display control unit 941 displays the observation positions and the observation setting Co corresponding to the user setting being selected on the observation setting display section 73. Further, the screen Sa2 is provided with a check box 76 for calling every activation, and a pull-down menu 77 provided corresponding to the check box 76. When the operation reception unit 942 receives an operation of checking the check box 76, observation positions and the observation setting Co are read as follows when the screen Sa2 is activated. That is, the display control unit 941 reads the observation positions and the observation setting Co corresponding to a user setting of a number being selected in the pull-down menu 77 from the storage unit 95 and displays the read observation positions and the observation setting Co on the observation setting display section 73. Further, a register button 78 is provided on the screen Sa2. When the operation reception unit 942 receives an operation of the register button 78, the observation position identifying unit 938 registers each of a plurality of setting positions (observation positions) indicated by the user setting being selected from the user setting list section 71 to the observation positions Po ("YES" in step S209), and proceeds to step S210. Accordingly, these observation positions Po are added to the observation position list section 662 in the screen Sa1 of FIG. 9B.

Incidentally, the observation position registration section 661 of the screen Sa1 is provided with a check box 661C for displaying a position on a navigation. When the operation reception unit 942 receives an operation of checking the check box 661C, the display control unit 941 displays the registered observation positions Po (that is, the observation positions Po displayed in the list of the observation position list section 662) on the navigation section 60. Further, when the operation reception unit 942 receives an operation of the move button 661B, the stage drive control unit 931 moves the stage 23 by a predetermined distance in the X direction or the Y direction. Of course, the stage 23 can also be moved according to the operation of the joystick 993 as described above.

Further, the observation position list section 662 is provided with a delete button 662A and a clear button 662B.

When the operation reception unit 942 receives an operation of the delete button 662A, the observation position identifying unit 938 deletes one observation position Po selected from the list of the observation position list section 662 from the list. Further, when the operation reception unit 942 receives an operation of the clear button 662B, the observation position identifying unit 938 deletes all the observation positions Po included in the list of the observation position list section 662 from the list.

Furthermore, the screen Sa1 of FIG. 9B is provided with a lens retraction setting button 663. When the operation reception unit 942 receives an operation of the lens retraction setting button 663, the Z-axis head drive unit 24z retracts the objective lens 33 upward to be moved the observation position Po when the head drive control unit 932 performs movement between the respective coordinates of the observation positions Po. As a result, it is possible to avoid interference between the workpiece 11 on the moving stage 23 and the objective lens 33.

The above is the flow when it is determined as "NO" in step S207 according to a configuration of the workpiece 11 illustrated in FIG. 7. On the other hand, for example, in a case where the workpiece 11 is one flat plate-shaped metal sample 111 formed of a metallographic structure as illustrated in FIG. 8A, the following flow may be executed. That is, when the operation reception unit 942 receives the scan imaging execution command ("YES" in step S207), the observation position identifying unit 938 sets the scan range Rs wider than the observation field of view V for the workpiece 11 as illustrated in FIG. 8B. The scan range Rs is received by the operation reception unit 942 together with the scan imaging execution command. Furthermore, the observation position identifying unit 938 divides the scan range Rs into a plurality of divided ranges Rd each having the same outer shape as the observation field of view V, registers the observation positions Po respectively set for the divided ranges Rd, and proceeds to step S210. Accordingly, these observation positions Po are added to the observation position list section 662 in the screen Sa1 of FIG. 9B.

In step S210, the observation position identifying unit 938 determines whether the registration of all the observation positions Po has been completed. Specifically, when the discrete imaging is selected ("NO" in step S207), the observation position identifying unit 938 determines whether the operation reception unit 942 has received an input indicating the completion of registration of all the observation positions Po. The flow returns to step S209 when the input cannot be confirmed ("NO" in step S210), or proceeds to step S211 when the input can be confirmed ("YES" in step S210). On the other hand, in a case where the scan imaging is selected (in the case of "YES" in step S207), when the registration of all the observation positions Po is completed along with the registration of the observation positions Po for the respective divided ranges R ("YES" in step S210), the flow proceeds to step S211.

In step S211, the reproduction control unit 937 determines whether to start batch replay. Specifically, when the operation reception unit 942 receives an operation of the batch replay button 651 illustrated in FIG. 9B, the reproduction control unit 937 determines to start the batch replay ("YES" in step S211).

Figure 9D:
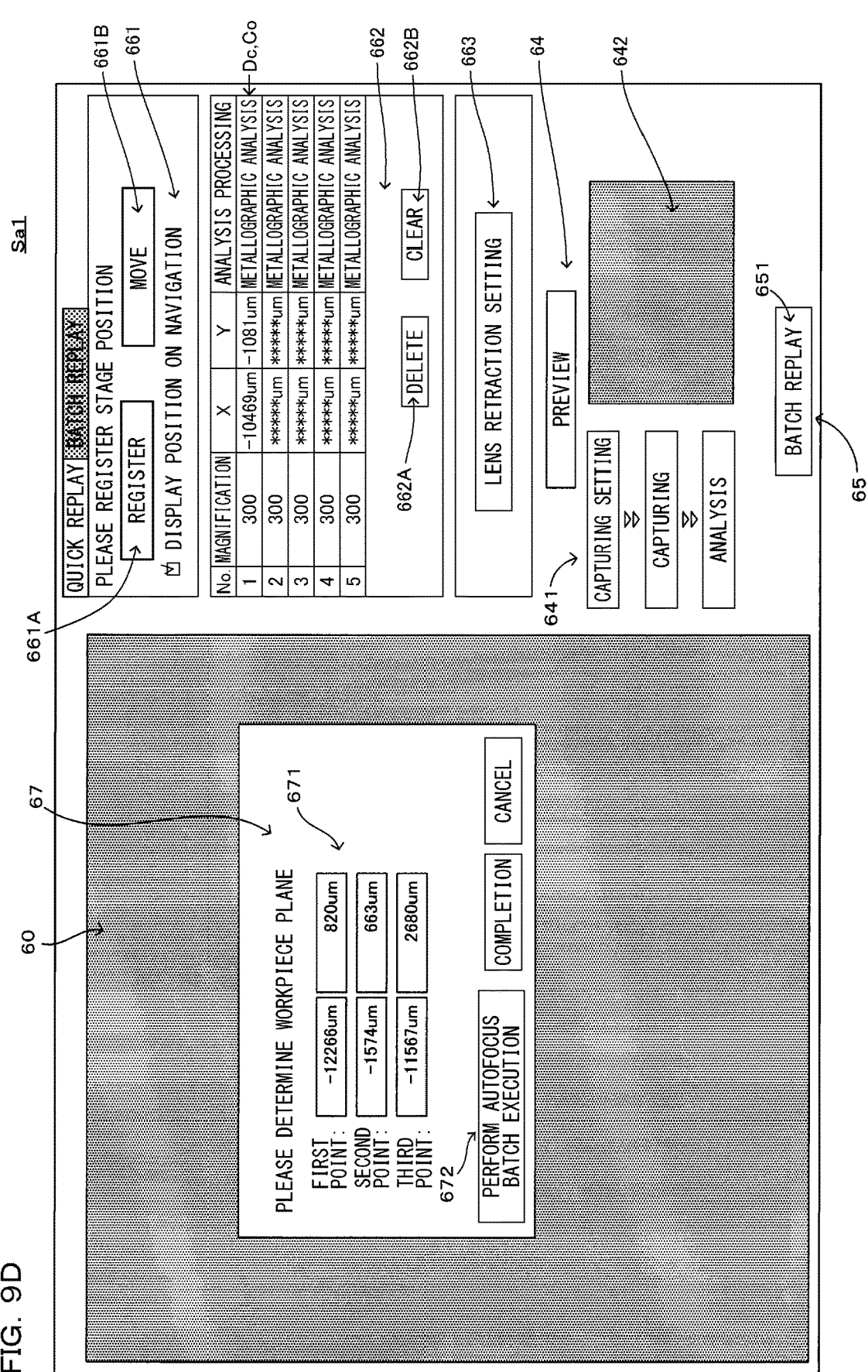
FIG. 9D is a view schematically illustrating a screen displayed on the display for the replay control.

In response to the determination to start the batch replay, the display control unit 941 displays a measurement point input section 67 (dialogue) illustrated in FIG. 9D on the display 97. Then, in step S212, a shape of the workpiece 11 placed on the sample support plane 231 of the stage 23 is measured. Specifically, as illustrated in FIG. 9D, the measurement point input section 67 includes an input field 671 that allows the user to input three or more different measurement points (three measurement points in this example), and an autofocus execution button 672. When the operation reception unit 942 receives an operation of inputting X coordinates and Y coordinates indicating positions of the three measurement points in the input field 671 and an operation of selecting the autofocus execution button 672, the reproduction control unit 937 measures a height of the workpiece 11 at these three measurement points using the focus height measurement unit 935. Specifically, the reproduction control unit 937 obtains a focus height with respect to the workpiece 11 at each of the measurement points based on the result measured by the focus height measurement unit 935. In step S213, the reproduction control unit 937 performs fitting of a shape, that is, a plane, indicated by the workpiece shape information 13 read from the storage unit 95 to the heights of the workpiece 11 at the respective measurement points obtained in step S212, thereby identifying a height and an inclination of the plane of the workpiece 11. Specifically, the height and inclination of the plane are identified by identifying a regression plane based on coordinates (X, Y, Z) of the respective measurement points. Note that the workpiece shape information 13 includes information indicating that the shape of the workpiece 11 is a plane. In other words, the workpiece shape information 13 is information indicating that a model used in regression analysis is a plane. Here, the workpiece shape information 13 may be included in the setting data Dc associated with one observation image I read in step S204. Further, the workpiece shape information 13 may be information selected by the user from among a plurality of predetermined geometric shapes or information indicating a three-dimensional shape selected by the user.

Figure 9E:
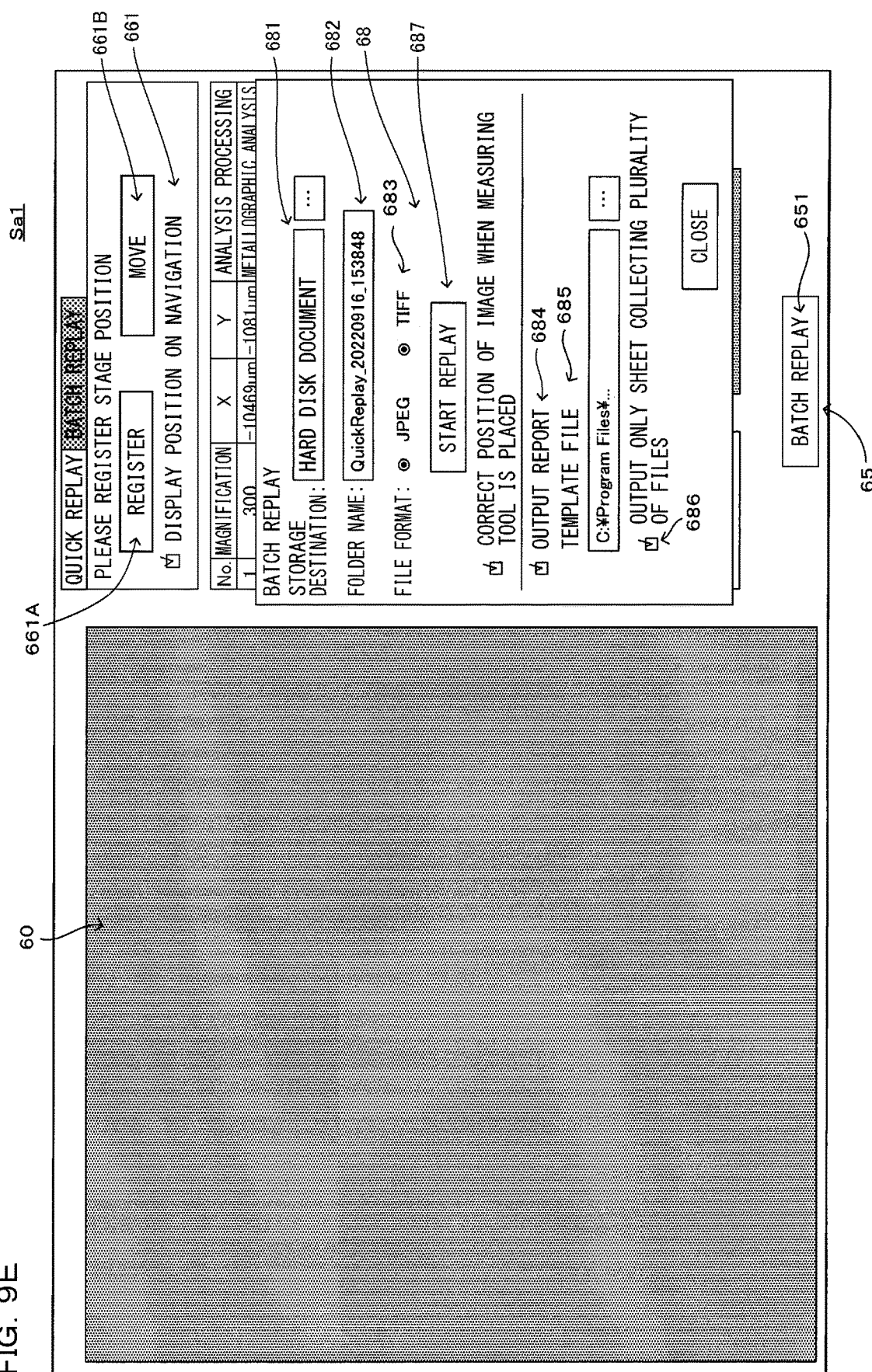
FIG. 9E is a view schematically illustrating a screen displayed on the display for the replay control.
Figure 9F:
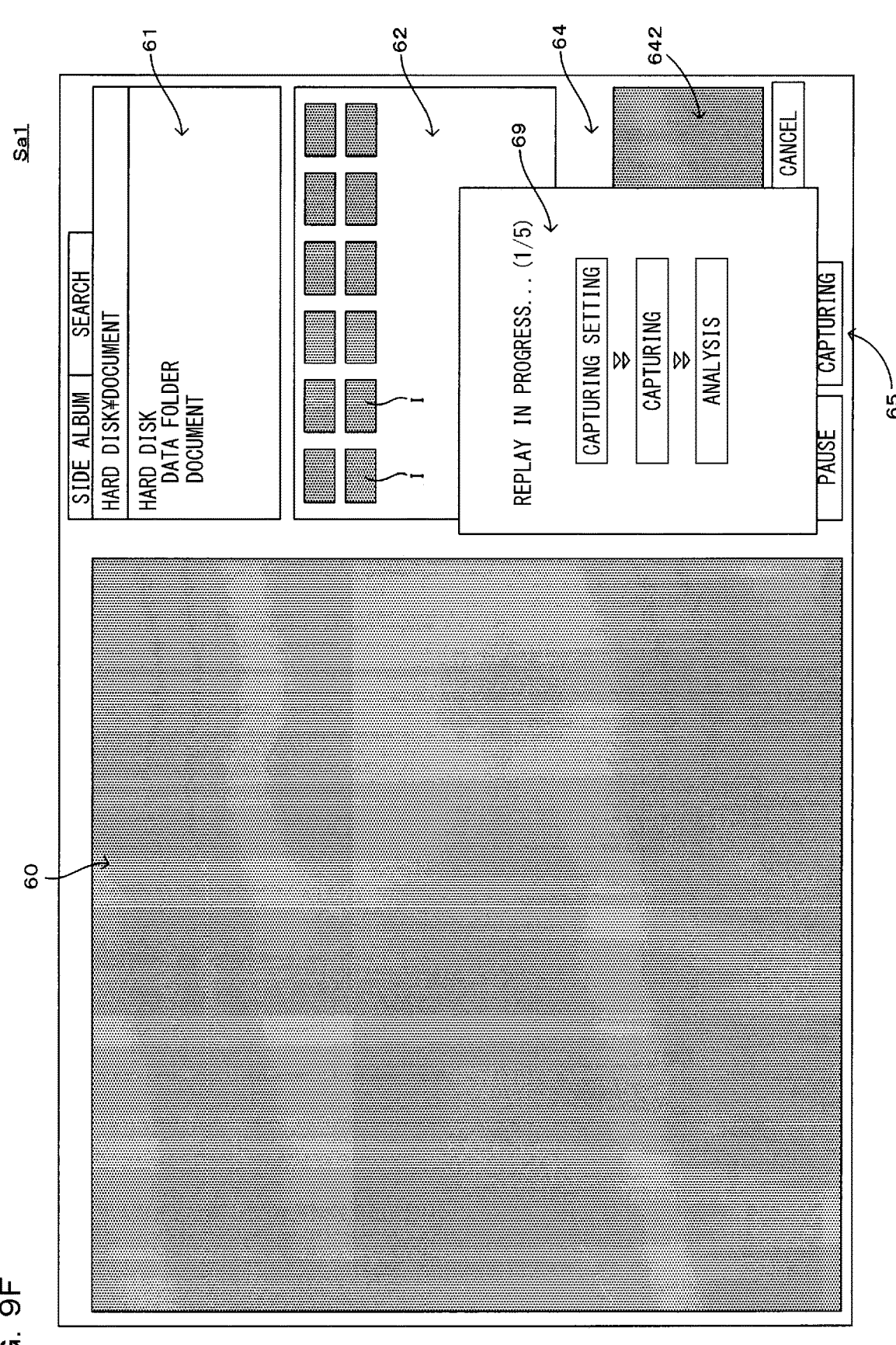
FIG. 9F is a view schematically illustrating a screen displayed on the display for the replay control.
Figure 9G:
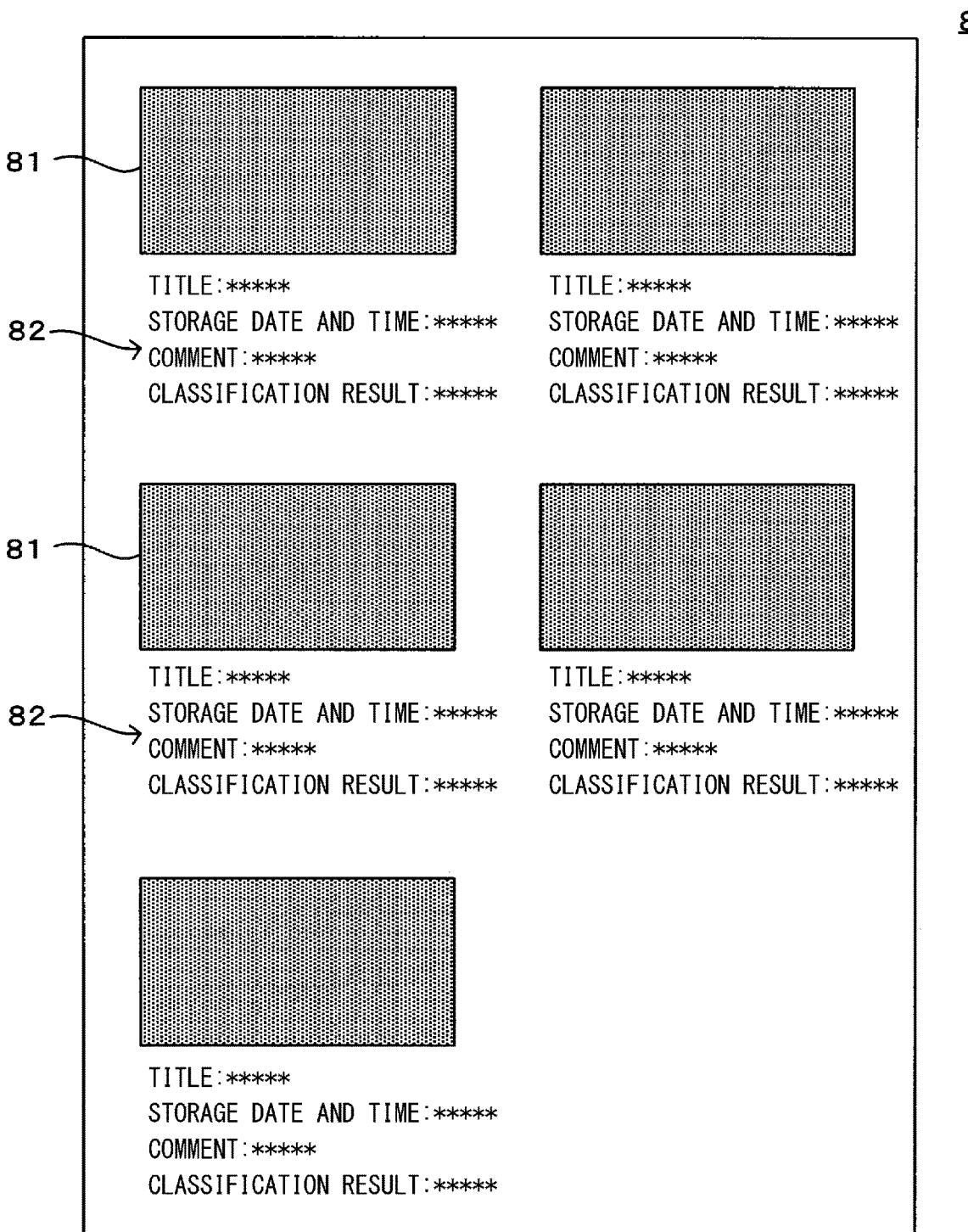
FIG. 9G is a view schematically illustrating a screen displayed on the display for the replay control.

When step S213 is completed, the display control unit 941 displays a batch replay setting screen 68 (dialogue) illustrated in FIG. 9E. The batch replay setting screen 68 includes: a storage destination input section 681 for inputting a storage destination of a replay execution result; a folder name input section 682 for inputting a folder name for storing the replay execution result; and a file format selection unit 683 for selecting a file format of the observation image I included in the replay execution result. Further, the batch replay setting screen 68 includes: a check box 684 for selecting whether to output a report; a template input section 685 for inputting a directory in which a template file of the report exists; and a check box 686 for selecting whether to output only a sheet in which a plurality of files are collected. Furthermore, the batch replay setting screen 68 includes a replay start button 687. The reproduction control unit 937 proceeds to step S214 when the operation reception unit 942 receives an operation of the replay start button 687. Note that, as the template file of the report, a template file associated with one observation image I read in step S204 may be used instead of inputting the directory.

In step S214, the reproduction control unit 937 causes the stage drive control unit 931 to control the X-axis stage drive unit 22x and the Y-axis stage drive unit 22y, thereby causing the objective lens 33 to face one observation position Po among the plurality of registered observation positions Po. As a result, the one observation position Po falls within the observation field of view V. Further, in step S215, the reproduction control unit 937 causes the head drive control unit 932 to control the Z-axis head drive unit 24z, thereby positioning the objective lens 33 at an observation height corresponding to a height at one observation position Po of the regression plane indicating the workpiece 11. As a result, the regression plane indicating the workpiece 11 is focused. Then, the reproduction control unit 937 executes replay in accordance with the observation setting Co (step S216). That is, the reproduction control unit 937 makes a setting for reproducing the observation setting Co associated with one observation image I selected as the replay target in step S203 (capturing setting), executes imaging of the observation image I (capturing), and executes metallographic analysis on the observation image I (analysis). At this time, the display control unit 941 displays a progress display section 69 illustrated in FIG. 9F on the screen Sa1. The progress display section 69 displays a classification item being executed among classification items of capturing setting, capturing, and analysis in a mode (for example, blinking display or the like) different from the other classification items (step S217). Note that the head drive control unit 932 may perform autofocus by moving the observation height upward and downward after positioning the objective lens 33 at the observation height corresponding to the height at the one observation position Po of the regression plane indicating the workpiece 11. Since the observation height is moved based on information of the regression plane, an autofocus range can be narrowed, so that accuracy of an in-focus position can be improved while shortening a processing time. Further, the metallographic analysis has been described as the "analysis processing" here, but the invention is not limited thereto, and analysis processing on a distance between two points or area or 3D height measurement may be performed.

In step S218, the reproduction control unit 937 determines whether the replay has been completed for all of the plurality of registered observation positions Po. Then, when the observation position Po for which the replay has not been executed is present ("NO" in step S218), the flow returns to step S214. That is, the replay with respect to one observation position Po is executed while changing the one observation position Po among the plurality of registered observation positions Po. In this manner, the batch replay is executed for the plurality of observation positions Po.

When the replay on the plurality of observation positions Po, that is, the batch replay is completed ("YES" in step S218), a report 80 (FIG. 9G), which is an execution result of the batch replay, is output to a storage destination corresponding to input contents in the storage destination input section 681 and the folder name input section 682 (step S219). The report 80 indicates each of the plurality of observation positions Po, set as targets of the batch replay, in association with image data 81 indicating the observation image I at the observation position Po and a text comment 82 for the observation image I.

In the embodiment described above, the observation image I, the observation setting Co corresponding to the observation image I, and the observation position Po corresponding to the observation image I are associated with each other and stored in the storage unit 95 in advance before the start of the batch replay (FIG. 5). Further, before the start of the batch replay, target positions (that is, the observation positions Po to be subjected to execution of the batch replay) for executing the batch replay are designated in step S207 or S209. Specifically, when the scan imaging is selected ("YES" in step S207), a plurality of target positions are designated for the workpiece 11 which is a target of the scan imaging. Further, when the discrete imaging is selected, a plurality of target positions are designated with respect to the workpiece 11 (step S209). Alternatively, when designation of one observation image I from among the observation images I stored in the storage unit 95 is received before the start of the batch replay (steps S203 and S208), the observation positions Po stored in association with the one observation image I are designated. The target positions or the observation positions Po designated in this manner are designated as the observation positions Po for which the batch replay is executed (steps S207 to S209). In particular, in the batch replay, a plurality of observation positions Po are designated, and the replay is executed for each of the plurality of observation positions Po. In this manner, the plurality of observation positions Po to be observed in the batch replay are identified along with reception of a simple user operation such as designation of the target positions (steps S207 and S209) or designation of the observation image I (steps S203 and S208).

Subsequently, the objective lens 33 is relatively moved to each of the plurality of designated observation positions Po (step S214). Then, at each of the plurality of observation positions Po, the observation image I of the workpiece 11 captured by the solid-state imaging element 35 is acquired based on the observation setting Co stored in association with the one observation image I designated among the observation images I stored in the storage unit 95 (steps S203 and S216). That is, the observation setting Co when the observation image I is acquired at each of the plurality of observation positions Po is designated along with reception of a simple user operation of designating a desired observation image I from among the observation images I stored in the storage unit 95 (step S203). Moreover, a relative distance (that is, an observation height) of the objective lens 33 with respect to the stage 23 is adjusted at each of the plurality of observation positions Po based on a result of measuring the observation height of the objective lens 33 with respect to the stage 23 (placement table) in an in-focus state in which the workpiece 11 (observation object) is focused as the focus height (a measurement result in step S212) and the shape information of the workpiece 11 (steps S212 and S215). As a result, it is possible to simply and quickly acquire the observation image I according to the observation setting Co while focusing on the workpiece 11 at each of the plurality of observation positions Po.

Further, the observation position identifying unit 938 identifies the plurality of observation positions Po based on the plurality of designated target positions (steps S207 and S209). In this regard, the reproduction control unit 937 acquires the observation image I of the workpiece 11 captured by the solid-state imaging element 35 based on the observation setting Co stored in association with the one observation image I designated among the observation images I stored in the storage unit 95 at each of the plurality of observation positions Po designated by the observation position identifying unit 938 (steps S203 and S214 to S216). In such a configuration, the observation images I at the plurality of observation positions Po can be uniformly acquired by the common observation setting Co (the observation setting Co associated with the one observation image I received as the replay target in step S203).

Further, the observation position identifying unit 938 identifies the target position or the observation position Po stored in association with the target image (one observation image I) as one observation position Po among the plurality of observation positions Po to be subjected to the batch replay. This identification is executed for each of the plurality of observation positions Po to identify the plurality of observation positions Po to be subjected to the batch replay (steps S207 to S209). In such a configuration, the observation position Po stored in association with the target position or the target image is identified as it is when the plurality of observation positions Po are identified. Therefore, a calculation amount required to identify the plurality of observation positions Po can be suppressed.

Further, the workpiece shape information 13 can include the information indicating that the shape of the workpiece 11 is the plane. The reproduction control unit 937 controls the Z-axis head drive unit 24z so as to adjust the relative distance (observation height) between the stage 23 and the objective lens 33 at each of the plurality of observation positions Po based on the height and inclination calculated based on the focus height measured by the focus height measurement unit 935 and the shape information (steps S211, S212, and S215). In such a configuration, the workpiece 11 can be quickly focused at each of the plurality of observation positions Po.

Further, the image processing unit 936 that executes the metallographic analysis (image processing) on the observation image I is provided. In this regard, the observation setting Co includes the metallographic analysis. Then, the reproduction control unit 937 causes the image processing unit 936 to execute the metallographic analysis included in the observation setting Co, stored in association with the observation image I designated among the observation images I stored in the storage unit 95, for the observation image I acquired at each of the plurality of observation positions Po (step S216). In such a configuration, the acquisition of the observation image I at the observation position Po and the execution of the image processing on the observation image I can be collectively executed for the plurality of observation positions Po.

Further, the workpiece 11 may include a metallographic structure, and the image processing may be the metallographic analysis for classifying a grain size of the metallographic structure indicated by the observation image I. In such a configuration, the classification of the grain size of the metallographic structure at the observation position Po can be collectively executed for the plurality of observation positions Po. Note that the metallographic analysis may be one in which nonmetallic inclusions such as an oxide compound and a sulfide compound are extracted, measured, and classified, or analysis in which a spheroklization rate of graphite is calculated.

Figure 10:
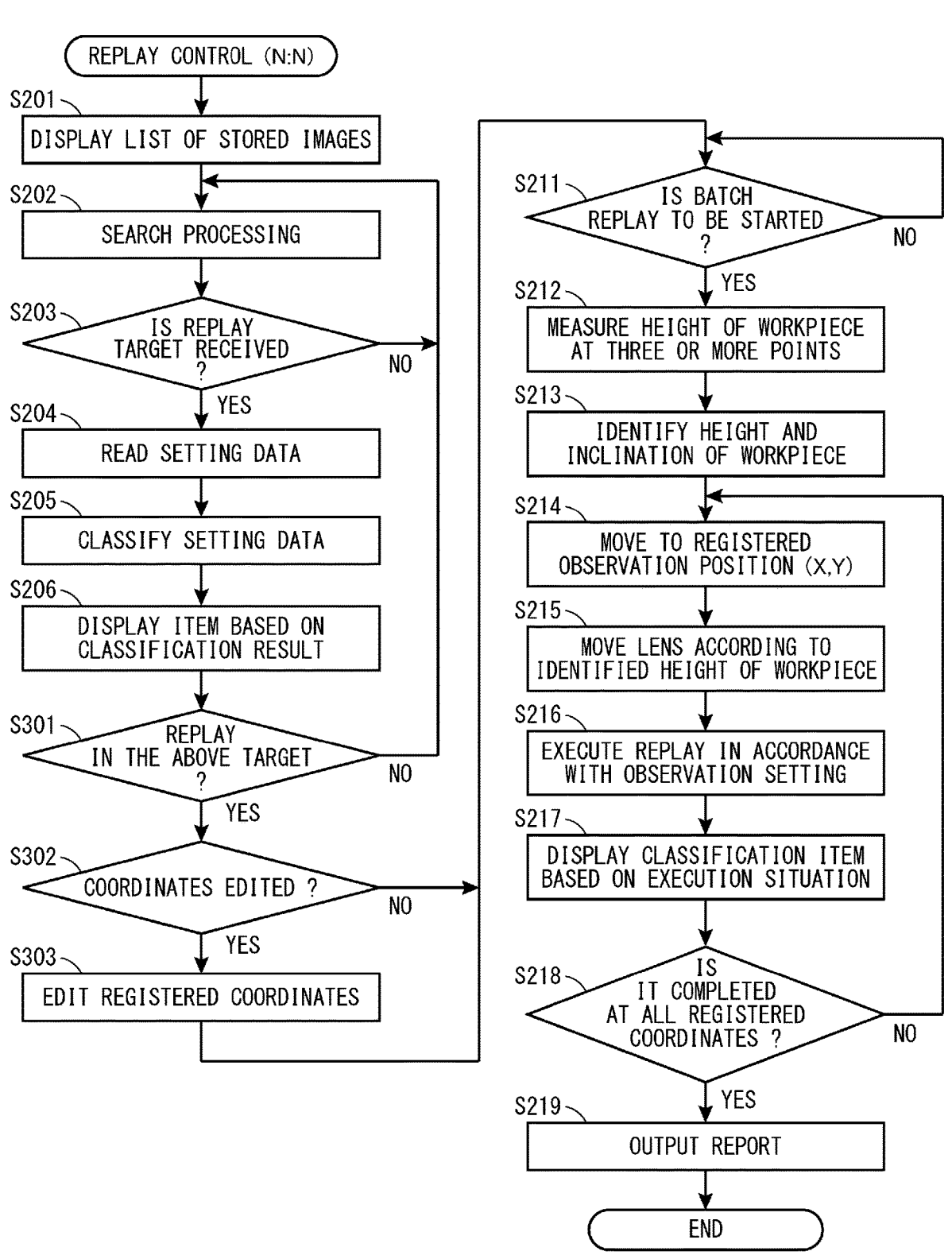
FIG. 10 is a flowchart illustrating a second example of the replay control.
Figure 11A:
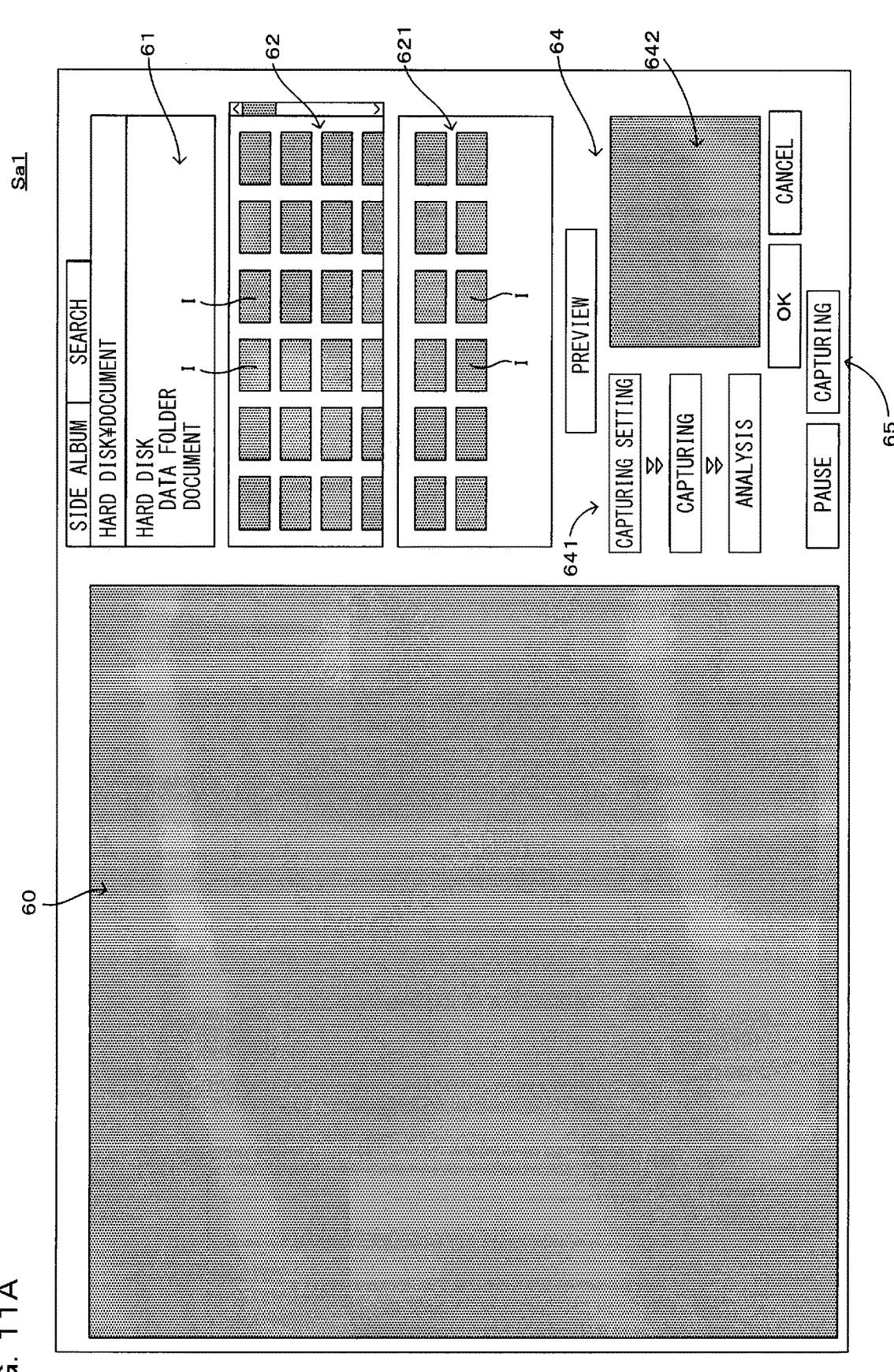
FIG. 11A is a view schematically illustrating a screen displayed on the display for the replay control.
Figure 11B:
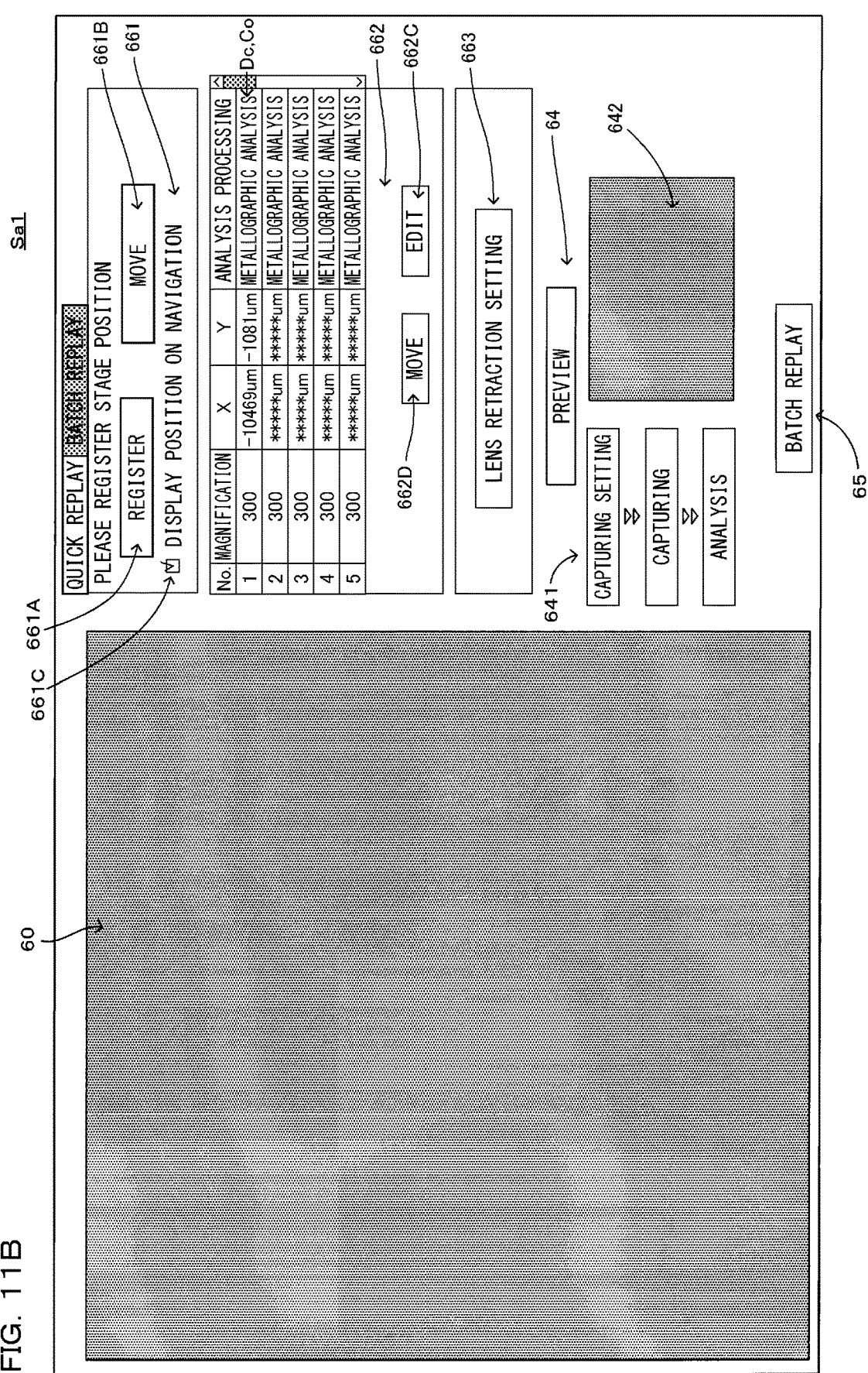
FIG. 11B is a view schematically illustrating a screen displayed on the display for the replay control.

FIG. 10 is a flowchart illustrating a second example of the replay control, and FIGS. 11A and 11B are views schematically illustrating screens displayed on the display for the replay control. The replay control of FIG. 10 is executed based on control of the reproduction control unit 937. Note that "N:N" in FIG. 10 indicates that observation based on the observation settings Co associated with N observation images I selected as replay targets is executed (replayed) for N (N is plural) observation positions (X, Y). Here, portions different from those in the first example of FIG. 6 will be mainly described, and portions common to those in the first example of FIG. 6 will be denoted by corresponding reference signs, and description thereof will be omitted.

In the second example of FIG. 10, the display control unit 941 displays the screen Sa1 of FIG. 11A on the display 97 in step S201. This screen Sa1 is provided with a replay target reception screen 621. The replay target reception screen 621 displays the observation image I selected as a replay target from among the observation images I displayed on the image list display section 62. Specifically, in step S203 of FIG. 10, the reproduction control unit 937 determines whether the operation reception unit 942 has received an operation of dragging and dropping the observation image I from the image list display section 62 to the replay target reception screen 621. Then, when the dragging and dropping operation is confirmed ("YES" in step S203), the reproduction control unit 937 determines that the observation image I as a target of the operation has been selected as the replay target, and the reading unit 945 reads the setting data Dc associated with one observation image I selected as the replay target from the storage unit 95 (step S204).

In particular, the selection of a replay target is executed for the plurality of (N) observation images I in the second example of FIG. 10. That is, the reproduction control unit 937 repeats steps S202 to S206 and S301 until the operation reception unit 942 receives an operation indicating execution of replay with the observation images I selected as the replay targets ("YES" in step S301).

In the case of "YES" in step S301, the reproduction control unit 937 determines to execute the replay according to the observation setting Co associated with the observation image I at the observation position Po(X, Y) associated with the observation image I for each of the plurality of selected observation images I. In response, the observation position identifying unit 938 determines that the plurality of observation positions Po corresponding to the plurality of selected observation images I are designated. Further, as illustrated in the screen Sa1 of FIG. 11B, the display control unit 941 displays the observation positions Po and the observation settings Co of each of the plurality of selected observation images I in a list of the observation position list section 662. The observation position list section 662 is provided with an edit button 662C and a move button 662D. When the operation reception unit 942 receives an operation of the edit button 662C, the observation position identifying unit 938 receives editing of the observation positions Po displayed in the observation position list section 662 ("YES" in step S302). That is, in step S303, the observation position identifying unit 938 edits X coordinates and Y coordinates of the observation positions Po displayed in the observation position list section 662 according to an operation received by the operation reception unit 942. Then, the flow proceeds to step S211. On the other hand, when the observation positions Po are not edited ("NO" in step S302), the flow proceeds to step S211. Thus, the observation position identifying unit 938 identifies the plurality of observation positions Po to be subjected to the batch replay based on the designation of the observation image I and the editing of coordinates in the observation position list section 662. Then, when it is determined in step S211 to start the batch replay, the batch replay is executed for the observation positions Po. Meanwhile, in step S216, replay is executed in accordance with the observation setting Co associated with the observation image I associated with the observation position Po to be subjected to execution of the replay. In other words, the second example is different from the first example of FIG. 6 in that the observation setting Co is individually set for each of the plurality of observation positions Po and the replay is executed in accordance with this observation setting Co.

In this manner, the observation position identifying unit 938 identifies the plurality of observation positions Po to be subjected to the batch replay based on the plurality of observation images I designated in steps S203 and S301. Further, the reproduction control unit 937 controls the image acquisition unit 934 to acquire the observation image I of the workpiece 11 captured by the solid-state imaging element 35 based on the observation setting Co stored in association with one designated observation image I, which corresponds to the observation position Po, among the observation images I stored in the storage unit 95 at each of the plurality of observation positions Po designated by the observation position identifying unit 938 (step S216). In such a configuration, the observation images I at the plurality of observation positions Po can be acquired by the observation settings Co corresponding to the respective observation positions Po.

As described above, in the present embodiment, the stage 23 corresponds to an example of a "placement table" of the invention; the workpiece 11 corresponds to an example of the "workpiece" of the invention; the objective lens 33 corresponds to an example of a "lens" of the invention; the solid-state imaging element 35 corresponds to an example of an "imaging element" of the invention; the observation position Po corresponds to an example of an "observation position" of the invention; the X-axis stage drive unit 22x and the Y-axis stage drive unit 22y correspond to examples of a "first movement unit" of the invention; the Z-axis head drive unit 24z corresponds to an example of a "second movement unit" of the invention; the focus height measurement unit 935 corresponds to an example of a "measurement instrument" of the invention; the image acquisition unit 934 corresponds to an example of an "image acquisition unit" of the invention; the observation image I corresponds to an example of an "observation image" of the invention; the observation setting Co corresponds to an example of an "observation setting" of the invention; the storage unit 95 corresponds to an example of a "storage unit" of the invention; the observation position identifying unit 938 corresponds to an example of an "identifying unit" of the invention; the reproduction control unit 937 corresponds to an example of a "reproduction control unit" of the invention; the magnification observation device 1 corresponds to an example of a "magnification observation device" of the invention; the workpiece shape information 13 corresponds to an example of "shape information" of the invention; the image processing unit 936 corresponds to an example of an "image processing unit" of the invention; the calculation unit 93 corresponds to an example of a "computer" of the invention; and the magnification observation program 12 corresponds to an example of a "magnification observation program" of the invention.

Note that the invention is not limited to the above-described embodiment, and various modifications can be made to those described above without departing from the gist thereof. For example, there is a case where a position of the workpiece 11 when the observation image I to be stored in the storage unit 95 has been acquired and a position of the workpiece 11 to be subjected to batch replay deviate from each other in the X direction, the Y direction, or a θ direction (rotation direction). In order to cope with such a case, the observation position identifying unit 938 may have an offset adjustment function.

Figure 12:
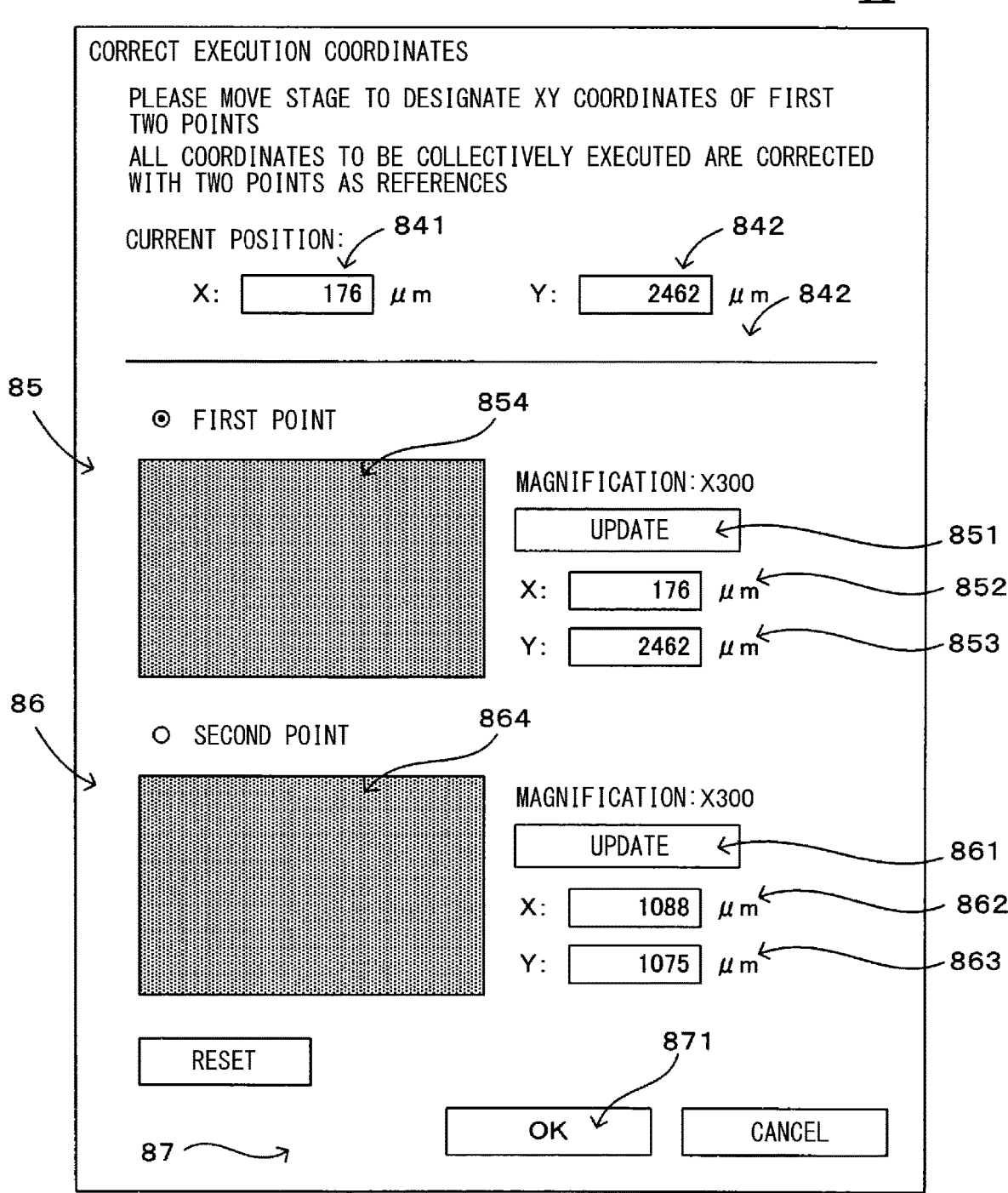
FIG. 12 is a view schematically illustrating an example of a screen for adjustment of an offset.

FIG. 12 is a view schematically illustrating an example of a screen for adjustment of an offset. That is, the display control unit 941 displays an offset adjustment screen 83 in FIG. 12 on the display 97. The offset adjustment screen 83 includes an X coordinate display section 841 that displays a current X coordinate, a Y coordinate display section 842 that displays a current Y coordinate, a first point designation section 85, a second point designation section 86, and a button operation section 87.

The X coordinate display section 841 displays a current X coordinate of the stage 23, and the Y coordinate display section 842 displays a current Y coordinate of the stage 23. Therefore, when the stage 23 is moved in the X direction and the Y direction in accordance with an operation of the joystick 993 received by the operation reception unit 942, display contents in the X coordinate display section 841 and the Y coordinate display section 842 are changed.

The first point designation section 85 includes an update button 851, an X coordinate setting section 852, a Y coordinate setting section 853, and an image display section 854. When the operation reception unit 942 receives an operation of the update button 851, the observation position identifying unit 938 determines that current X coordinate and Y coordinate of the stage 23 are designated as an X coordinate and a Y coordinate of a first point, and sets the designated X coordinate and Y coordinate in the X coordinate setting section 852 and the Y coordinate setting section 853, respectively. Further, the image display section 854 displays an image obtained by capturing a position (X, Y) set in the X coordinate setting section 852 and the Y coordinate setting section 853 by the solid-state imaging element 35.

The second point designation section 86 includes an update button 861, an X coordinate setting section 862, a Y coordinate setting section 863, and an image display section 864. When the operation reception unit 942 receives an operation of the update button 861, the observation position identifying unit 938 determines that current X coordinate and Y coordinate of the stage 23 are designated as an X coordinate and a Y coordinate of a second point, and sets the designated X coordinate and Y coordinate in the X coordinate setting section 862 and the Y coordinate setting section 863, respectively. Further, the image display section 864 displays an image obtained by capturing a position (X, Y) set in the X coordinate setting section 862 and the Y coordinate setting section 863 by the solid-state imaging element 35.

Then, when the operation reception unit 942 receives an operation of an OK button 871 of the button operation section 87, the observation position identifying unit 938 corrects coordinates such that the coordinates of the first point and the second point before update coincide with coordinates of the first point and the second point after the update. Specifically, an offset in the XY directions based on the coordinates of the first point or the second point before and after the update is adjusted by performing rotation correction with the first point or the second point as a starting point or performing expansion or contraction of a distance between the first point and the second point.

Figure 13:
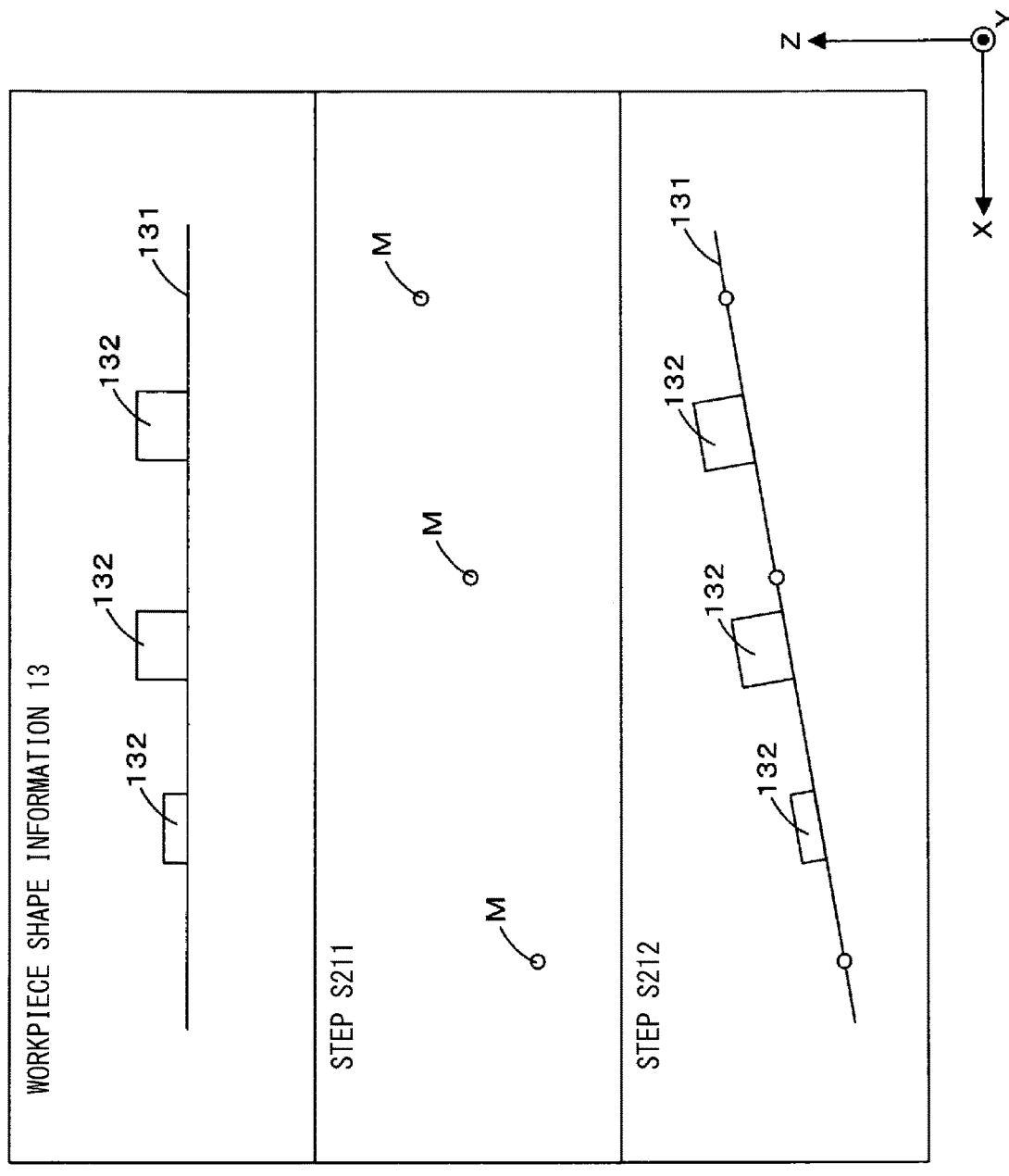
FIG. 13 is a view schematically illustrating control when workpiece shape information indicates a three-dimensional shape of a workpiece.

Further, the shape of the workpiece 11 indicated by the workpiece shape information 13 is not limited to the plane, and may be, for example, a three-dimensional shape of the workpiece 11. FIG. 13 is a view schematically illustrating control when workpiece shape information indicates a three-dimensional shape of a workpiece. As illustrated in a field of "workpiece shape information 13" in FIG. 13, the workpiece shape information 13 indicates a reference plane 131 set for the workpiece 11 and a height of a structure 132 (for example, an electronic component such as an IC) protruding from the reference plane 131. The workpiece shape information 13 may be a result obtained by actually measuring the three-dimensional shape of the workpiece 11 to be a model, or may be computer-aided design (CAD) data indicating the three-dimensional shape of the workpiece 11.

Then, in the replay control of FIG. 6 or 10, heights of the workpiece 11 at three or more measurement points M are measured in step S211. Further, in step S212, fitting of the reference plane 131, indicated by the workpiece shape information 13, is performed with respect to the three measurement points M. As a result, a height and an inclination of the workpiece 11 are identified.

Further, in the above example, the observation position identifying unit 938 identifies the designated observation position Po (target position) or the observation position Po associated with the designated observation image I (target image) as it is as the observation position Po to be subjected to the execution of the batch replay. However, a position obtained by correcting the observation position Po can also be designated as the observation position Po to be subjected to the execution of the batch replay according to the height and inclination of the workpiece 11 designated in step S212.

Figure 14:
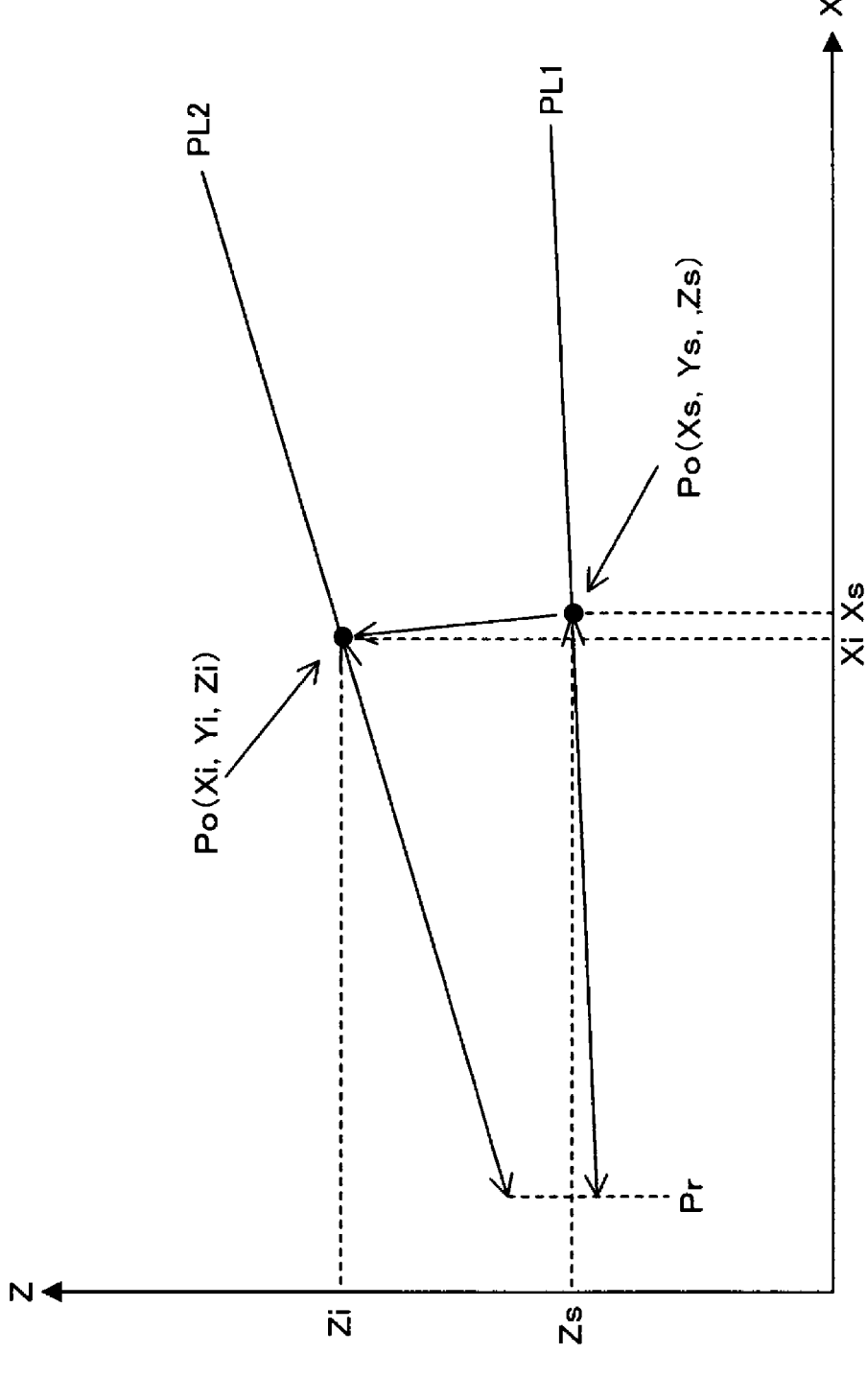
FIG. 14 is a view schematically illustrating a modification of a method for identifying an observation position.

FIG. 14 is a view schematically illustrating a modification of a method for identifying an observation position. In this modification, the storage unit 95 stores plane identifying information indicating a height and an inclination of a plane, which represents the workpiece 11 when the observation image I has been captured, in association with the observation image I. In replay control of FIG. 6 or 10, when the observation image I is selected as a replay target in step S203, the observation position identifying unit 938 reads plane identifying information associated with the observation image I from the storage unit 95. Furthermore, steps S211 and S212 are executed in the same manner as described above, and a height and an inclination of a plane PL2, which represents the workpiece 11 to be subjected to execution of batch replay, are identified.

Then, the plane PL2 is compared with a plane PL1 indicated by the plane identifying information. Specifically, the observation position identifying unit 938 causes reference positions Pr of the plane PL1 and the plane PL2 to match each other. As the reference position, for example, an end of the workpiece 11 can be selected. Alternatively, in a case where the workpiece 11 is a semiconductor wafer, a position of an orientation flat or a notch may be selected as the reference position. Note that matching between the reference positions Pr may be omitted when it is difficult to determine the reference positions Pr. Subsequently, the observation position identifying unit 938 identifies a position on the plane PL2 corresponding to an observation position Po(Xs, Ys, Zs) on the plane PL1 indicated by the plane identifying information as an observation position Po(Xi, Yi, Zi) for executing the batch replay.

In such a modification, the observation position identifying unit 938 identifies, for each of the plurality of observation positions Po, a position, obtained by correcting a target position or the observation position Po stored in association with a target image based on the focus height (step S111) measured by the focus height measurement unit 935 and the workpiece shape information 13 of the workpiece 11, as one observation position Po among the plurality of observation positions Po to be subjected to the execution of the batch replay, thereby identifying the plurality of observation positions Po. In such a configuration, the observation position Po can be designated with high accuracy according to a height and an inclination of the workpiece 11.

Further, imaging or image processing executed for the observation positions Po in the batch replay can be appropriately changed. For example, a plurality of observation images I may be captured while changing a height of the objective lens 33 at the observation positions Po and depth synthesis (image processing) of synthesizing focused portions in the plurality of observation images I may be executed.

Further, various specific examples of contents included in the observation settings Co are assumed. Specifically, it is possible to assume a setting at the time of executing depth synthesis (a lower limit, an upper limit, and the like of the objective lens 33 whose height is changed in the Z direction), a magnification of the objective lens 33 (the magnification may be changed using either the above-described revolver type or a zoom type), a measurement content (metallographic analysis, depth synthesis, measurement of a height of a structure from a reference plane, flaw detection, and the like), the order of observing a plurality of observation positions Po in order (path order), a lens type (an inverted lens or an upright lens), and the like.

Further, in step S212, the three measurement points are set based on the result of the operation reception unit 942 receiving the user operation on the operation unit 99. However, the reproduction control unit 937 may calculate three measurement points by the following calculation. Specifically, a convex polygon including a plurality of position coordinates designated in steps S207 to S210 is obtained. Then, three points forming a triangle having the largest area from vertexes of the convex polygon are selected as the three measurement points.

Furthermore, various types of the workpiece 11 to be subjected to execution of replay can be assumed. For example, it can be configured such that an inspection of a pattern formed on a semiconductor wafer is replayed for the semiconductor wafer. For example, a cross section of an image obtained by depth synthesis can be displayed on the display 97, and the presence or absence of pattern collapse or the like can be inspected. Such replay may be performed by scan imaging, or may be performed by discrete imaging by discretely identifying a plurality of target positions of the pattern inspection. Furthermore, specific contents of the pattern inspection of the semiconductor wafer can be variously changed, and whether flatness of the pattern is appropriate may be measured.

Alternatively, it can be configured such that inspection of each bare chip can be replayed for the workpiece 11 in which a plurality of bare chips are mounted on a substrate. The replay can be executed on such a workpiece by either scan imaging or discrete imaging. Further, when the discrete imaging is performed, target positions can be designated for the bare chips, respectively, and the replay can be executed for a plurality of observation positions Po corresponding to the plurality of bare chips.

The invention is generally applicable to a magnification observation technique for magnifying and observing an observation object.

What is claimed is:
1. A magnification observation device comprising:
a placement table;
a lens configured to form an image of an observation object to be placed on the placement table;
an imaging sensor configured to capture the image of the observation object formed by the lens;
a first movement unit configured to change a relative horizontal position between the placement table and the lens in order to change an observation horizontal position;
a second movement unit configured to change a relative distance of the lens with respect to the placement table in order to change an observation height;
a measurement instrument configured to measure, as a focus height, an observation height of the lens with respect to the placement table in an in-focus state in which the observation object captured by the imaging sensor is focused;
an observation position registration section for registering the observation horizontal position;
an image acquisition unit configured to acquire an observation image of the observation object captured by the imaging sensor based on an observation setting;
a storage configured to store the observation image acquired by the image acquisition unit, the observation setting corresponding to the observation image, and the observation horizontal position corresponding to the observation image in association with each other;

an identifying unit configured to receive designation of a target position or designation of a target image from a plurality of the observation images stored in the storage, and configured to identify a plurality of observation horizontal positions based on the target position or an observation horizontal position stored in association with the target image;

an operation reception unit configured to receive a selection operation of selecting the observation image from among the observation images stored in the storage as replay targets;

a reading unit configured to read the observation setting associated with the observation image that received the selection operation by the operation reception unit; and a reproduction controller configured to determine whether to start batch replay to acquire an observation image sequentially at each of the plurality of observation horizontal positions based on the observation image selected as the replay targets, and in response to a start instruction for the batch replay, to successively control:

the first movement unit to relatively move a field of view of the imaging sensor to each a respective observation horizontal position of the plurality of observation horizontal positions identified by the identifying unit, the second movement unit to adjust the relative distance at the respective observation horizontal position of the plurality of observation horizontal positions based on the focus height measured by the measurement instrument and shape information of the observation object, and the image acquisition unit to acquire an observation image of the observation object, captured by the imaging sensor based on the observation setting read by the reading unit.

2. The magnification observation device according to claim 1, wherein the identifying unit identifies a plurality of observation horizontal positions based on a plurality of designated target positions, and the reproduction controller controls the image acquisition unit to acquire an observation image of the observation object captured by the imaging sensor based on an observation setting stored in association with one observation image designated among the observation images stored in the storage at each of the plurality of observation horizontal positions designated by the identifying unit.

3. The magnification observation device according to claim 1, wherein the identifying unit identifies a plurality of observation horizontal positions based on a plurality of designated target images, and the reproduction controller controls the image acquisition unit to acquire an observation image of the observation object captured at each of the plurality of observation horizontal positions designated by the identifying unit by the imaging sensor based on an observation setting stored in association with one designated observation image corresponding to the observation horizontal position among the observation images stored in the storage.

4. The magnification observation device according to claim 1, wherein the identifying unit identifies the plurality of observation horizontal positions by executing, for each of the plurality of observation horizontal positions, identification of the target position or the observation horizontal position stored in association with the target image as one observation horizontal position of the plurality of observation horizontal positions.

5. The magnification observation device according to claim 1, wherein the identifying unit identifies the plurality of observation horizontal positions by executing, for each of the plurality of observation horizontal positions, identification of a position, obtained by correcting the target position or the observation horizontal position stored in association with the target image based on the focus height measured by the measurement instrument and the shape information of the observation object, as one observation horizontal position of the plurality of observation horizontal positions.

6. The magnification observation device according to claim 1, wherein the shape information includes information indicating that a shape of the observation object is a plane, and the reproduction controller controls the second movement unit to adjust the relative distance according to a height at each of the plurality of observation horizontal positions on the plane of which a height and an inclination are calculated based on the focus height measured by the measurement instrument.

7. The magnification observation device according to claim 1, further comprising an analysis processing unit that executes analysis processing on the observation image, wherein the observation setting includes an analysis setting, and the reproduction controller causes the analysis processing unit to execute the analysis processing on the observation image acquired at each of the plurality of observation horizontal positions based on the analysis setting included in the observation setting stored in association with the observation image designated among the observation images stored in the storage.

8. The magnification observation device according to claim 7, wherein the analysis setting includes a setting for performing metallographic analysis, and the analysis processing unit executes the metallographic analysis based on the setting included in the analysis setting.

9. A magnification observation method comprising:

a step of registering a plurality of observation horizontal positions;

a step of identifying the plurality of observation horizontal positions based on a designated target position or a target image designated from among observation images, the observation images being stored in association with observation settings corresponding to the observation images and observation horizontal positions corresponding to the observation images, respectively;

a step of receiving a selection operation of selecting the observation image from among the observation images being stored as replay targets;

a step of reading the observation setting associated with the observation image that received the selection operation by a reading unit; and a step of determining whether to start batch replay to acquire an observation image sequentially at each of the plurality of observation horizontal positions based on the observation image selected as the replay targets, and in response to start instruction for the batch replay, successively:

relatively moving a lens that forms an image of an observation object placed on a placement table to a respective observation horizontal position of the plurality of observation horizontal positions identified, adjusting a relative distance of the lens with respect to the placement table at the respective observation horizontal position of the plurality of observation horizontal positions based on a result, obtained by measuring an observation height of the lens with respect to the placement table as a focus height in an in-focus state in which the observation object captured by an imaging sensor that captures the image of the observation object formed by the lens is focused, and shape information of the observation object, and acquiring, at the respective observation horizontal position of the plurality of observation horizontal positions, an observation image of the observation object captured by the imaging sensor based on the observation setting read by the reading unit.

10. A non-transitory recording medium that stores a magnification observation program in a computer-readable manner, the magnification observation program causing a computer to execute:

a step of registering a plurality of observation horizontal positions;

a step of identifying the plurality of observation horizontal positions based on a designated target position or a target image designated from among observation images, the observation images being stored in association with observation settings corresponding to the observation images and observation horizontal positions corresponding to the observation images, respectively;

a step of receiving a selection operation of selecting the observation image from among the observation images being stored as replay targets;

a step of reading the observation setting associated with the observation image that received the selection operation by a reading unit; and a step of determining whether to start batch replay to acquire an observation image sequentially at each of the plurality of observation horizontal positions based on the observation image selected as the replay targets, and in response to start instruction for the batch replay, successively;

relatively moving a lens that forms an image of an observation object placed on a placement table to a respective observation horizontal position of the plurality of observation horizontal positions identified, adjusting a relative distance of the lens with respect to the placement table at the respective observation horizontal position of the plurality of observation horizontal positions based on a result, obtained by measuring an observation height of the lens with respect to the placement table as a focus height in an in-focus state in which the observation object captured by an imaging sensor that captures the image of the observation object formed by the lens is focused, and shape information of the observation object, and acquiring, at the respective observation horizontal position of the plurality of observation horizontal positions, an observation image of the observation object captured by the imaging sensor based on the observation setting read by the reading unit.

\* \* \* \* \*